US008949150B2

(12) United States Patent
Siddens et al.

(10) Patent No.: US 8,949,150 B2
(45) Date of Patent: Feb. 3, 2015

(54) FRAUD DETECTION SYSTEM AUTOMATIC RULE MANIPULATOR

(71) Applicants: Cory H. Siddens, Mountain View, CA (US); Shawna Matz, Danville, CA (US)

(72) Inventors: Cory H. Siddens, Mountain View, CA (US); Shawna Matz, Danville, CA (US)

(73) Assignee: Visa International Service Association, San Francisco, CA (US)

( * ) Notice: Subject to any disclaimer, the term of this patent is extended or adjusted under 35 U.S.C. 154(b) by 49 days.

(21) Appl. No.: 13/730,581

(22) Filed: Dec. 28, 2012

(65) Prior Publication Data

US 2013/0212006 A1   Aug. 15, 2013

Related U.S. Application Data

(60) Provisional application No. 61/581,948, filed on Dec. 30, 2011.

(51) Int. Cl.
  *G06Q 20/38*   (2012.01)
  *G06Q 20/40*   (2012.01)
(52) U.S. Cl.
  CPC .......... *G06Q 20/4016* (2013.01); *G06Q 20/381* (2013.01)
  USPC ................. 705/39; 235/380; 705/18; 705/35; 705/44; 705/50
(58) Field of Classification Search
  None
  See application file for complete search history.

(56) References Cited

U.S. PATENT DOCUMENTS

| 7,856,384 | B1* | 12/2010 | Kulasooriya et al. ........... 705/35 |
| 7,925,586 | B2 | 4/2011 | Cole et al. |
| 8,244,629 | B2 | 8/2012 | Lewis et al. |
| 2004/0236696 | A1* | 11/2004 | Aoki et al. ...................... 705/50 |
| 2007/0106580 | A1* | 5/2007 | Yang et al. ...................... 705/35 |
| 2007/0119919 | A1* | 5/2007 | Hogg et al. .................... 235/380 |
| 2008/0249911 | A1 | 10/2008 | Chan et al. |
| 2009/0265211 | A1* | 10/2009 | May et al. ......................... 705/9 |
| 2011/0040479 | A1 | 2/2011 | Uyama |
| 2012/0203698 | A1* | 8/2012 | Duncan et al. .................. 705/44 |
| 2012/0323783 | A1* | 12/2012 | Canetto ........................... 705/44 |

FOREIGN PATENT DOCUMENTS

WO     01/04846 A1    1/2001

OTHER PUBLICATIONS

U.S. Appl. No. 13/168,795, filed Jun. 24, 2011.

* cited by examiner

*Primary Examiner* — Robert R Niquette
(74) *Attorney, Agent, or Firm* — Kilpatrick Townsend & Stockton LLP

(57) ABSTRACT

Embodiments of the invention are directed to a fraud detection system that automatically converts the currency and value of received transaction data to correspond to the currency in fraud detection rules established by a merchant. The converted transaction data is then analyzed against the fraud detection rules to determine whether the transaction data indicates fraudulent activity.

20 Claims, 12 Drawing Sheets

| Currency Conversion Table - 12/18/2012 | | | | |
|---|---|---|---|---|
| | U.S. Dollar | British Pound | Euro | Japanese Yen |
| U.S. Dollar | 1.00 | 1.63 | 0.009 | 0.01 |
| British Pound | 0.62 | 1.00 | 1.00 | 0.007 |
| Euro | 0.76 | 1.23 | 1.00 | 0.009 |
| Japanese Yen | 84.3 | 137.06 | 111.61 | 1.00 |

FRAUD DETECTION SYSTEM AUTOMATIC RULE MANIPULATOR

CROSS-REFERENCES TO RELATED APPLICATIONS

This application is a non-provisional application of and claims the benefit of priority of U.S. Provisional Application No. 61/581,948, filed on Dec. 30, 2011, which is herein incorporated by reference in its entirety for all purposes.

BACKGROUND

The Internet has made it increasingly easy for consumers to conduct transaction with merchants. The globalization of the economy facilitated by online transactions allows a consumer in one country to conduct transactions in countries throughout the world. Similarly, merchants are able to more easily and freely maintain presences in multiple countries.

For example, a user from the United States may conduct transactions at one or more of merchant's websites based in England, Japan, and the United States. These transaction may be conducted either over the Internet through separate merchant websites dedicated to each country, or while physically present at the foreign merchant locations. However, allowing consumers to conduct transactions with multiple websites linked to a single merchant may increase the risk to the merchant of suffering from fraudulent transactions. Increased risk and challenges may include a greater difficulty in determining which transactions are legitimate and which transactions are fraudulent, as well as whether the user is a legitimate consumer or a fraudster. Fraud is a significant issue for merchants, as it can cost merchants substantial amounts of money in the form of both lost revenue and lost stock.

Merchants with presences in multiple countries have the increased difficultly of reviewing transactions from each country in order to determine whether fraudulent activity has occurred. This is because in many cases, each country will conduct and process transactions in its local currency. Some systems today can include rules that evaluate transactions and assist merchants in deciding whether a specific transaction should be accepted or rejected.

New and enhanced methods of detecting fraudulent activity have become increasingly necessary to provide greater security and functionality to globalized merchants.

Embodiments of the invention address the above problems and other problems, individually and collectively.

BRIEF SUMMARY

Embodiments of the present invention are related to systems and methods for receiving transaction data at a fraud detection system configured to automatically convert the transaction data to correspond to the currency contained in received fraud detection rules.

One embodiment of the invention is directed to a method comprising receiving, at a server computer, a fraud detection rule for a first value in a first currency, from a client computer operated by a user. The method further comprises storing the fraud detection rule in a merchant profile. The method further comprises receiving transaction data by the server computer, and determining whether a received transaction total in the transaction data is in a second currency. The method further comprises automatically determining a converted transaction total in the first currency, wherein the converted transaction total in the first currency is equivalent in value to the received transaction total in the second currency, and evaluating the converted transaction total in the first currency with the fraud detection rule. The method further comprises providing a message based on the evaluation of the converted transaction total in the first currency with the fraud detection rule.

Another embodiment of the invention is directed to a server computer comprising a processor and a non-transitory computer-readable storage medium. The computer readable medium comprises code executable by the processor for implementing a method. The method comprises receiving, at a server computer, a fraud detection rule for a first value in a first currency, from a client computer operated by a user. The method further comprises storing the fraud detection rule in a merchant profile. The method further comprises receiving transaction data by the server computer, and determining whether a received transaction total in the transaction data is in a second currency. The method further comprises automatically determining a converted transaction total in the first currency, wherein the converted transaction total in the first currency is equivalent in value to the received transaction total in the second currency, and evaluating the converted transaction total in the first currency with the fraud detection rule. The method further comprises providing a message based on the evaluation of the converted transaction total in the first currency with the fraud detection rule.

These and other embodiments of the invention are described in further detail below with reference to the Figures and the Detailed Description.

BRIEF DESCRIPTION OF THE DRAWINGS

FIG. 10 shows a depiction of a currency conversion table according to an embodiment of the invention.

DETAILED DESCRIPTION

Figure 1:
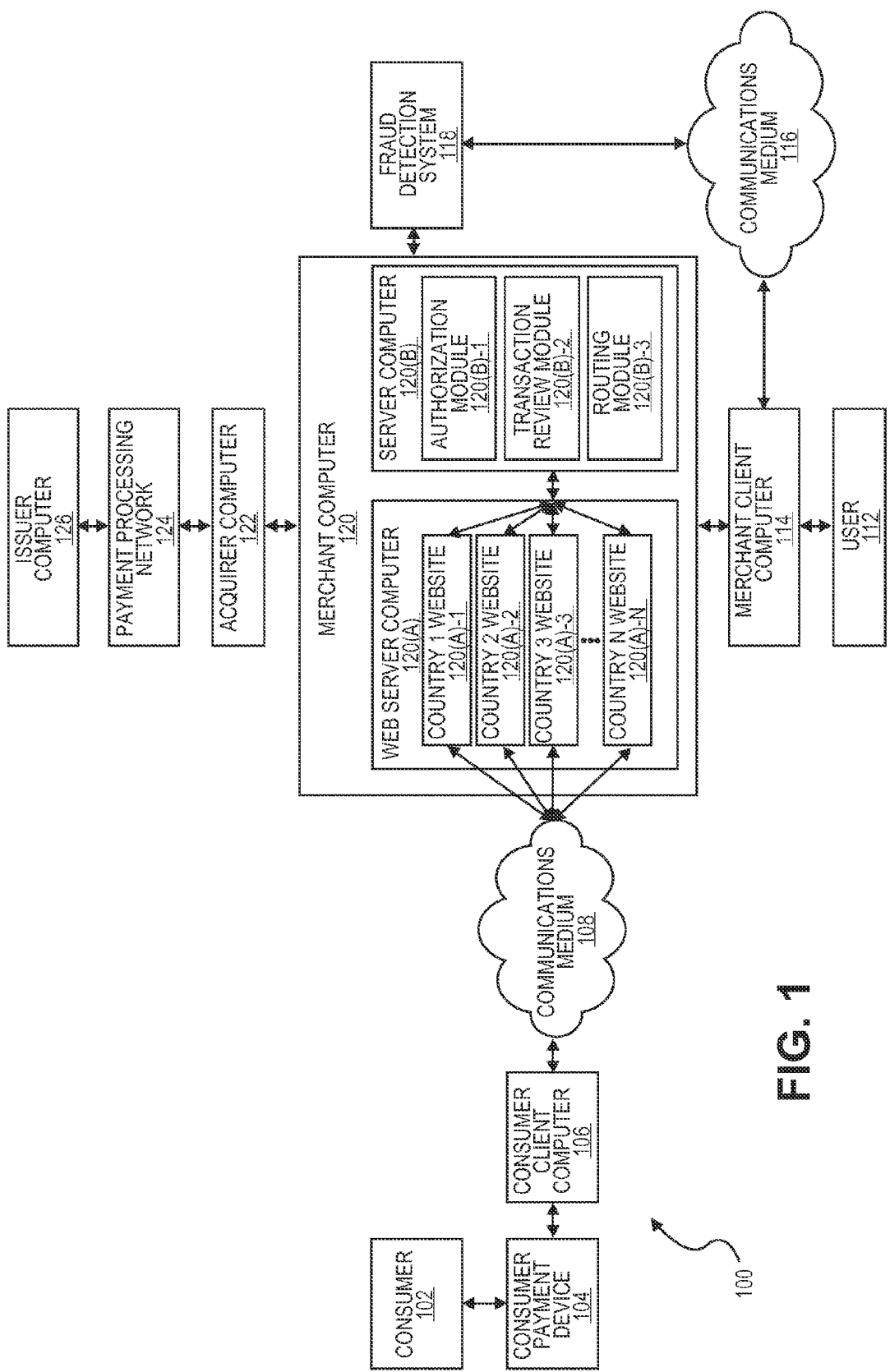
FIG. 1 shows a system diagram of a payment processing system including a fraud detection system according to an embodiment of the invention.

Prior to discussing embodiments of the invention, some descriptions of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "client computer" may include any suitable computational apparatus. The client computer may be an apparatus operated by a consumer, a user associated with a merchant, or any other individual. The client computer may use any suitable wired or wireless network, including the Internet, in order to communicate with other systems. For example, a consumer client computer may be used by a consumer to interact with a merchant Internet storefront in order to conduct a transaction. A merchant client computer may be used by a user associated with a merchant to interact with other merchant computer systems and a fraud detection system.

The term "fraud detection system" may include a single computer or a network of suitable processing entities (e.g., computers) that may have the ability to receive, process and evaluate transaction details to provide fraud detection services. The fraud detection system may have or operate at least a server computer and may include a plurality of databases. The fraud detection system may include a selection of fraud detection rules and merchant profiles that can be created, modified, and/or deleted. The fraud detection system may further record an audit log of modifications made to customizable settings, the selection of fraud detection rules, and merchant profiles that reside within the system.

The term "fraud detection rule" may refer to a rule for detecting fraud. In some embodiments, the fraud detection rule may be in a fraud detection system, and may include a customizable rule. Each fraud detection rule may allow customization as to name, description, category, status as a core rule, and for further processes or actions to be taken if the fraud detection rule is triggered. Each fraud detection rule may further allow for rule conditions to be established based on a number of criteria. Some fraud detection rules may be business rules that indicate whether a transaction should be accepted, rejected, or submitted for further review.

Some fraud detection rules may be velocity rules that are triggered when one or more received transactions exceed a predetermined value or count over a period of time. In some embodiments, types of velocity rules may include order velocity rules, product velocity rules and global velocity rules. Order velocity rules may be used to monitor the number of transactions placed using a particular email address, account number, etc., over a period of time and over a particular amount. Product velocity rules may be used to monitor the number of transactions that includes a particular product using a particular email address, account number, etc., over a period of time and over a particular number of the particular product. Global velocity rules may be used to monitor the number of transactions involving any criteria (e.g. email address, account number, address, device fingerprint).

The term "set of fraud detection rules" may refer to one or more fraud detection rules that a user (e.g., a merchant) has selected or created for a merchant profile. Once a user has selected or created one or more fraud detection rules, the fraud detection rules can be populated into the merchant profile. In some embodiments, the set of fraud detection rules may be a combination of business rules and velocity rules.

The term "user" may refer to an individual or entity who can access the fraud detection system using credentials (e.g. merchant ID, user ID and password) that the individual or entity is authorized to use. As used herein, user may also refer to an individual or entity that is not authorized to access the fraud detection system but has access to authorized credentials allowing them access to the fraud detection system. The user can access the fraud detection system using a client computer. The user can access merchant profiles and fraud detection rules and make modifications to merchant profiles and/or fraud detection rules that are then associated with the user ID logged into the fraud detection system and stored in the fraud rules modification database.

The term "merchant profile" may include a selection of fraud detection rules and settings established by a merchant with the fraud detection system. A merchant profile may be added, modified or deleted in the fraud detection system. The merchant profile may include customizable settings for profile name and profile description. The merchant profile may also include default and customizable fraud detection rules, including velocity rules. In some embodiments, changes to any of the fraud detection rules associated with the merchant profile as saved to the merchant profile. The merchant profile may be associated with one or more users who have access to modify the selection of fraud detection rules contained in the merchant profile.

The term "first value" may refer to a monetary value. The first value may be a monetary value established by a user in a fraud detection rule. The first value may indicate a particular threshold value, where all transactions exceeding the first value may increment a counter or may be declined. For example, a fraud detection rule may state that all transactions from a particular account number that have a transaction total greater than $100 must be declined or a counter associated with a velocity rule incremented and then evaluating against other fraud detection rules.

The term "second value" may refer to a monetary value. The second value may be a monetary value included as part of transaction data received by the fraud detection system in either an authorization response message or a simple message from a merchant to the fraud detection system. In some embodiments, the second value and the first value may be in different currencies, which may require a currency conversion for further processing.

The term "currency" may refer to a unit of value in a monetary system. In some embodiments, currency may refer to a type of monetary system that is chosen as part of a fraud detection rule. For example, a user may create a fraud detection rule for transactions greater than $100, where the currency is in U.S. Dollars. Currency may also refer to a type of money system that a merchant accepts in a transaction and which may be converted by a fraud detection system. In some embodiments, currency may refer to either a "first currency," which may be a currency chosen in a fraud detection rule, or a "second currency," which may be the currency of a transaction total received as part of transaction data.

The term "transaction data" may refer to data related to a transaction. Transaction data may be related to a transaction for the purchase of goods or services. Transaction data may include data for a specific transaction, including items purchased, item prices, transaction total, shipping address, billing address, account number, email address, payment methods, authentication data, merchant data, etc. In some embodiments, transaction data may be generated once the consumer attempts to submit a transaction for processing. In other embodiments, transaction data may be generated and sent by the merchant system based on items added to a consumer's shopping cart. In some embodiments, transaction data is sent from a merchant in an authorization request message as part of transaction processing. In other embodiments, transaction data is received by the fraud detection system in an authorization response message. In other embodiments, transaction data is received by the fraud detection system sent directly from a merchant as a data message or is parsed from a merchant order form.

The term "transaction total" may refer to an amount. In some embodiments, the transaction total is the purchase total for a transaction that is sent to and received by the fraud detection system. A transaction total may refer to a received transaction total, which may be a transaction total received by the fraud detection system included in transaction data sent by a merchant to the fraud detection system or included in an authorization response message generated by an issuer computer and sent to the fraud detection system. A transaction total may also refer to a converted transaction total. The converted transaction total may be the result of a conversion process to convert the value of the received transaction total into a second value that is in a second currency. The converted transaction total may then be evaluating against a set of fraud detection rules.

The term "automatically" may refer to an action that can be conducted without direct human interaction. In some embodiments, the fraud detection system may automatically determine a converted transaction total using the received transaction total and the currency conversion table stored in the fraud detection system. In these embodiments, the system can determine, without the need for interaction by a human, whether there is sufficient data or a confidence value has been reached. If it determines that there is insufficient data or that a confidence value has not been reached, the system may query additional resources to obtain additional data without additional prompting.

The term "equivalent in value" may refer to a valuation. In some embodiments, equivalent in value may refer to a received transaction total and a converted transaction total being equal to each other in terms of monetary value. This may be the case even when the received transaction total and the converted transaction total are in different currencies.

In some embodiments, the process of generating the converted transaction total equivalent in value to the received transaction total is conducted by the fraud detection system. In some embodiments, the fraud detection system converts a received transaction total that is in a second currency into a converted transaction total that is in a first currency. After the conversion process, the converted transaction total and the received transaction total are equivalent in value. In some embodiments, the transaction analyzer module analyzes the received transaction total to determine the currency of the received transaction total. Based on the currency, the currency conversion module accesses a currency table database to retrieve a currency conversion table. The currency conversion table may be used to convert the received transaction total to a converted transaction total.

The term "evaluating the converted transaction total" may refer to a process in the fraud detection system. In some embodiments, evaluating the converted transaction total includes checking the converted transaction total with a fraud detection rule and making a determination based on whether the converted transaction total exceeds a predetermined value. For example, a fraud detection rule may require that all transactions over $300 should be declined, while all transactions below $300 should be accepted.

In other embodiments, evaluating the converted transaction total includes checking the converted transaction total from a transaction with a velocity rule, incrementing a counter when the velocity rule is triggered, and then evaluating the counter with a set of fraud detection rules for a particular merchant associated with the transaction. For example, a velocity rule may be triggered for all transactions over $300 using a particular account number over a particular time interval. When the rule is triggered, a counter is incremented. The incremented counter is then checked against the set of fraud detection rules for the particular merchant, and if the counter exceeds a certain predetermined value established in a fraud detection rule, the fraud detection system may send a message to a merchant computer indicating that the transaction should be rejected.

The term "merchant computer" may include any suitable computational apparatus operated by a merchant. Examples of merchant computers may include an access device or an Internet merchant computer. In some embodiments, the merchant computer may include a web server computer that may host a plurality of websites that are established for one or more countries. For example, the web server may host separate websites for the United States, England, Mexico, Japan, etc. for a single merchant, which may be accessed by consumers. The merchant computer may be configured to generate authorization request messages for transactions between the merchant and consumers, and route the authorization request message to a payment processing network for additional transaction processing.

The term "currency conversion table" may refer to a set of currency data. In some embodiments, the currency conversion table includes one or more currencies and exchange rates between the one or more currencies. The currency conversion table may be in the form of a table or as text. In some embodiments, the currency conversion table is received from external data sources by the fraud detection system and stored in a database. In some embodiments, the currency conversion table is updated with data from external data sources at a predetermined interval (e.g. hourly, daily). In other embodiments, the currency conversion table may be updated in real-time when transactions are received by the fraud detection system.

The term "determining a converted transaction total" may refer to a process of converting a received transaction total. In some embodiments, the converted transaction total is determined by the fraud detection system. The fraud detection system may determine the currency of the received transaction total, access a currency conversion table stored in the fraud detection system, and calculate a converted transaction total. The converted transaction total may be based on the currency conversion between the currency of the received transaction total and the currency established by the merchant. In other embodiments, the received transaction total is converted to both U.S. dollars and the currency of the merchant.

The term "external data source" may refer to an entity or system that provides data. An external data source may be a source of data that is external to a system. In some embodiments, an external data source may be located physically external from the system (e.g., in a separate physical location or separate computer), or may be located in a distinct location within a physical memory component within the system. In other embodiments, an external data source may refer to a source within the system that requires additional authentication processes or credentials to access. An external data source may be a source outside of a system firewall or located outside of a network of a company, system or entity.

In some embodiments, the external data sources may include third party vendors that gather, analyze, and provide currency data. In some embodiments, these third party vendors provide the currency data for a fee. External data sources may also include sources, either internal or external to a system, which charge a fee for the retrieval and provision of data.

The term "predetermined interval" may refer to a period of time. In some embodiments, a predetermined interval may be established by a user for retrieving data from external data sources. For example, a user may establish a predetermined interval of one hour for retrieving a currency conversion table from an external data source. The predetermined interval may also be a period of time established by a system as a default setting. In other embodiments, the user may establish a predetermined interval over which to evaluate transactions that trigger a fraud detection rule.

The term "authorization response message" may refer to a message sent as part of an authorization process for a financial transaction. It may be a message that is sent from an issuer computer or system in response to an authorization request message sent from a merchant computer. The authorization response message may comprise data indicating whether the authorization process was successful, failed, could not be performed, unknown or other status. In some embodiments, the authorization response message includes transaction data that may be received and used by a fraud detection system in order to determine whether the transaction data indicates fraudulent activity.

The term "database" may include any hardware, software, firmware, or combination of the preceding for storing and facilitating retrieval of information. Also, the database may use any of a variety of data structures, arrangements, and compilations to store and facilitate retrieval of information.

The term "storing" may refer to recording information regarding a fraud detection rule or a merchant profile into a database. The storing may be accomplished by the server computer in the fraud detection system, and the stored data may be placed in a database. For example, if a user adds or modifies a fraud detection rule, the new or updated fraud detection rule may be stored to a merchant profile in the fraud detection system.

I. Systems

Example embodiments are typically implemented in the context of a financial transaction. Therefore, prior to further discussing a currency conversion process within a fraud detection system, a brief description of transaction processing will be presented.

An exemplary system 100 for transaction processing can be seen in FIG. 1. The system 100 includes a consumer 102, a consumer payment device 104, a consumer client computer 106, a user 112, a merchant client computer 114, a fraud detection system 118, a merchant computer 120, an acquirer computer 122, a payment processing network 124, and an issuer computer 126. In a typical transaction, a consumer 102 may purchase goods or services at a merchant associated with the merchant computer 120 using a consumer payment device 104. The transaction details are processed by the merchant computer 120 and then sent to the acquirer computer 122. The acquirer computer 122 can communicate with an issuer computer 126 via a payment processing network 124 for additional transaction processing. For simplicity of illustration, a certain number of components are shown is shown in FIG. 1. It is understood, however, that embodiments of the invention may include more than one of each component. In addition, some embodiments of the invention may include fewer than all of the components shown in FIG. 1.

Also, the components in FIG. 1 may communicate via any suitable communication medium (including the Internet), using any suitable communication protocol. The consumer client computer 106 may communicate with the merchant computer 120 via a communications medium 108, such as a network (e.g. the Internet). Similarly, the merchant client computer 114 may communicate with the fraud detection system 118 via a communications medium 116, such as a network (e.g. the Internet).

The consumer 102 may be an individual, or an organization such as a business, that is capable of purchasing goods or services. The user 112 may be a merchant, an employee of the merchant, or any other individual who has access to the merchant client computer 114.

The consumer payment device 104 may be in any suitable form. For example, suitable consumer payment devices can be hand-held and compact so that it can fit into a consumer's wallet and/or pocket (e.g., pocket-sized). The consumer payment device 104 can include a processor, and memory, input devices, and output devices, operatively coupled to the processor. Specific examples of consumer payment devices include cellular or wireless phones, personal digital assistants (PDAs), pagers, portable computers, smart cards, and the like. The consumer payment devices can also be debit devices (e.g., a debit card), credit devices (e.g., a credit card), or stored value devices (e.g., a pre-paid or stored value card).

The consumer 102 can use the consumer client computer 106, which is communicatively coupled to the merchant computer 120 via the communications medium 108, in order to conduct a transaction with the merchant. The consumer client computer 106 may be in any suitable form. Example of consumer client computers 106 include any device capable of accessing the Internet, such as a personal computer, cellular or wireless phones, personal digital assistants (PDAs), tablet PCs, and handheld specialized readers. The consumer client computer 106 transmits data through the communications medium 108 to the merchant computer 120. In some embodiments of the invention, the consumer payment device 106 and the consumer client computer 106 may be a single device, such as a digital wallet stored on a mobile phone.

Figure 2:
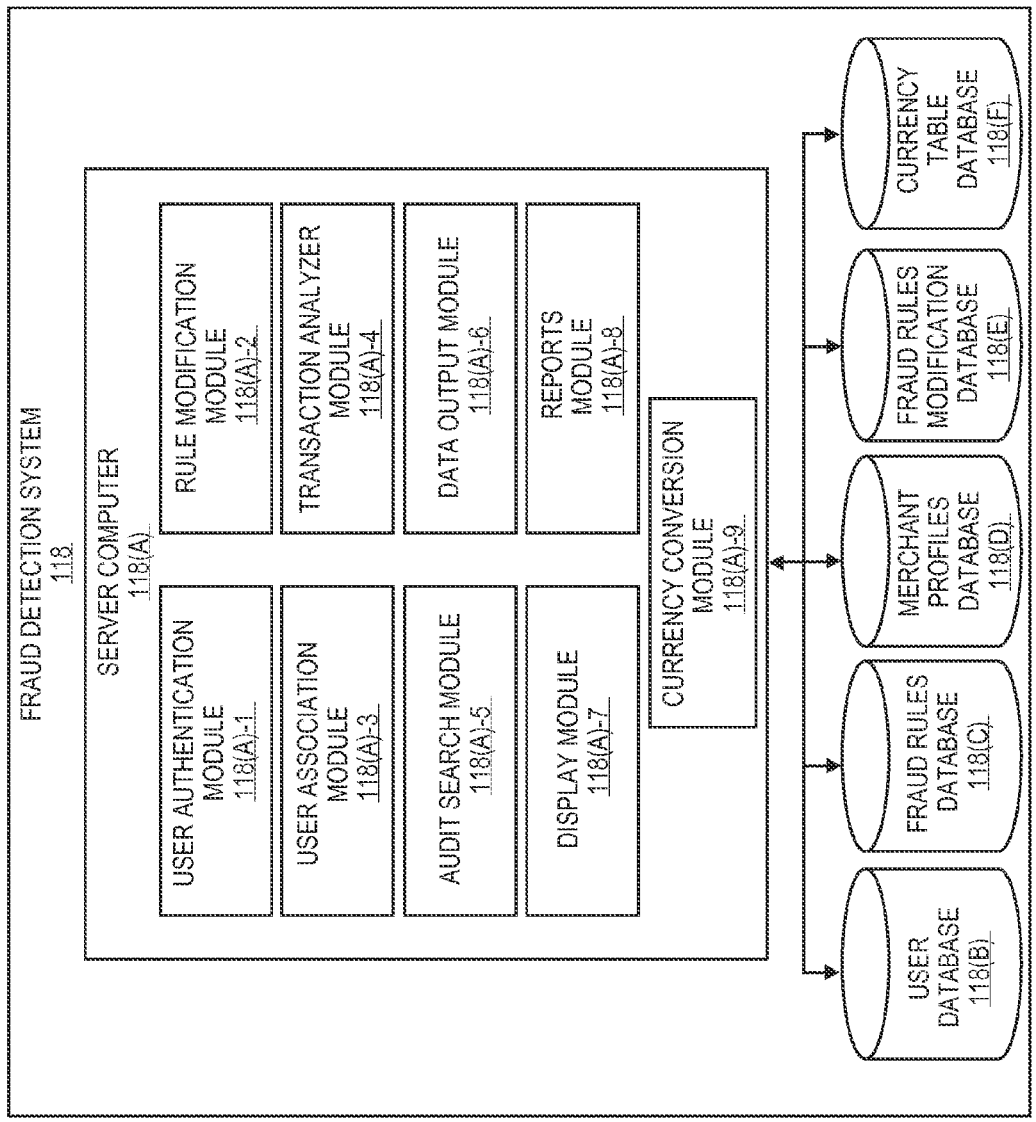
FIG. 2 shows a block diagram of components of a fraud detection system according to an embodiment of the invention.

As depicted in FIG. 2, the fraud detection system 118 may comprise a server computer 118(A) including a user authentication module 118(A)-1, a rule modification module 118(A)-2, a user association module 118(A)-3, a transaction analyzer module 118(A)-4, an audit search module 118(A)-5, a data output module 118(A)-6, a display module 118(A)-7, a reports module 118(A)-8, and a currency conversion module 118(A)-9. The various modules may be embodied by computer code residing on computer readable media.

The server computer 118(A) may be operatively coupled to one or more databases. The one or more databases may comprise a user database 118(B), a fraud rules database 118(C), a merchant profiles database 118(D), a fraud rules modification database 118(E), and a currency table database 118(F).

The user authentication module 118(A)-1 may handle the verification of the authorization credentials for a user (e.g. merchant ID, user name, password). The user authentication module 118(A)-1 may access a user database 118(B) in determining whether a user 112 seeking access to the fraud detection system 118 is an authorized user. For example, when presented with credentials, the user authentication module 118(A)-1 may access the user database 118(B) to determine whether the provided user name is in the user database 118(B) and whether the provided password corresponds to the password linked to the user name.

The rule modification module 118(A)-2 may receive modifications from a user 112 to fraud detection rules or to a merchant profile. The rule modification module 118(A)-2 may further access the merchant profiles database 118(D) to store modifications made to a merchant profile. For example, when a user 112 makes a modification, the rule modification module 118(A)-2 may access a merchant profile database 118(D) associated with the authorization credentials entered by the user 112. The rule modification module 118(A)-2 may also access the fraud rules database 118(C) to access pre-established fraud detection rules to add to the merchant profile or to store newly created fraud detection rules created by the user for the merchant profile. In some embodiments of the invention, new fraud detection rules created by the user are stored in the merchant profiles database 118(D) with the corresponding merchant profile.

The user association module 118(A)-3 may associate any modifications made by a user 112 with the authorization credentials entered by the user 112. For example, if the user 112 logged into the fraud detection system 118 with the user name "user1," the user association module 118(A)-3 may record all the modifications made by the user 112, associate the modifications with the user name "user1," and store the data in the fraud rules modification database 118(E).

The transaction analyzer module 118(A)-4 may evaluate transaction data received by the fraud detection system 118 from the merchant computer 120. In some embodiments of the invention, the fraud detection system 118 receives an authorization response message, containing the transaction data, from the merchant computer 120 and the message is analyzed by the transaction analyzer module 118(A)-4. In some embodiments, the fraud detection system 118 receives the transaction data from the merchant computer 120 in other forms, including, but not limited to, an order form, a transaction checkout page, and a query message.

In some embodiments, when the transaction analyzer module 118(A)-4 evaluates received transaction data, the transaction analyzer module 118(A)-4 may parse the transaction data to retrieve the transaction total. The transaction analyzer module 118(A)-4 may determine the currency of the transaction total. The transaction analyzer module 118(A)-4 may also access the currency conversion module 118(A)-9 in order to convert the received transaction total prior to evaluating the transaction data with the fraud detection rules.

In some embodiments, the converted transaction total is first evaluated against velocity rules by the transaction analyzer module 118(A)-4. If one or more velocity rules are triggered, a counter associated with each of the one or more triggered velocity rules may be incremented. The counter is then evaluated against the set of fraud detection rules, including business rules, to determine whether the transaction associated with the transaction data should be accepted, rejected or submitted for further review. In some embodiments, the business rules associated with the merchant are evaluated with the counter to determine whether the counter has exceeded a maximum count established by the merchant. In some embodiments, if the counter has exceeded the maximum count, the transaction analyzer module 118(A)-4 may determine that the transaction should be rejected. If the counter has not been exceeded, the determination may be that the transaction should be accepted.

For example, a velocity rule may check the transaction data to determine if a specified shipping address has conducted a transaction with a transaction total of $100 within a month, and a business rule may indicate that if 5 or more transactions match the velocity rule, the transaction associated with the transaction data should be declined. Assuming the received transaction total is £110 (British Pounds), the received transaction total would be converted to U.S. Dollars. If the exchange rate is such that £110 is greater than $100, the counter associated with the velocity would be incremented to indicate that a transaction matching the criteria of the velocity rule has been received. The counter would then be evaluated against the business rule.

In another embodiment, the converted transaction total is evaluated against a fraud detection rule in the form of a business rule by the transaction analyzer module 118(A)-4. For example, a business rule may state that a transaction should be rejected if the transaction total exceeds $100. Assuming the received transaction total is £110 (British Pounds), the currency conversion module 118(A)-9 would convert the received transaction total from British pounds to U.S. Dollars. The converted transaction total would be evaluated with the business rule and accepted or rejected depending on whether the transaction total exceeds $100.

If the result from the transaction analyzer module 118(A)-4 is to "ACCEPT" the transaction, the fraud detection system 118 may send a message to the merchant computer that the transaction between the merchant and the consumer 102 can be completed. If the result from the transaction analyzer module 118(A)-4 is a "REJECT", the fraud detection system 118 may send a message to the merchant computer that the transaction between the merchant and the consumer 102 should not be completed as one or more fraud detection rules were triggered. The fraud detection system 118 may also return a message to be presented to the consumer 102 that the consumer 102 may be contacted if there are any issues. For example, the consumer may receive a message stating, "Thank you for your order. We will contact you if there are any issues." In some embodiments of the invention, the message does not indicate that a "REJECT" was determined for the transaction as the consumer 102 may be attempting to conduct fraudulent transactions. If the result from the transaction analyzer module 118(A)-4 is a "REVIEW", the fraud detection system 118 would "hold" the transaction until it can be further reviewed and it is determined whether it should be accepted or rejected. In some embodiments, the fraud detection system 118 can automatically invoke a settlement upon an "ACCEPT" decision by the transaction analyzer module 118(A)-4.

The audit search module 118(A)-5 may handle the audit log search function of the fraud detection system 118. The audit search module 118(A)-5 receives input from a user 112 comprising search parameters to conduct an audit log search. The audit search module 118(A)-5 processes the search parameters and conducts a search of the fraud rules modification database 118(E).

The data output module 118(A)-6 outputs the results of the audit log search conducted by the audit search module 118(A)-5 to be displayed to the user 112.

The display module 118(A)-7 may display the layout of the fraud detection system 118. In some embodiments of the invention, the fraud detection system 118 is accessed as a website over a communications medium (e.g. the Internet), via an Internet-enabled device capable of displaying HTML. Other embodiments allow the fraud detection system 118 to be displayed in other suitable manners on other suitable display devices.

The reports module 118(A)-8 may compile the data obtained from the fraud detection system 118 from analyzing transactions. In some embodiments of the invention, the reports module 118(A)-8 can provide detailed statistics and data for the merchant on the performance of the merchant's profile and selection of fraud detection rules. For example, the reports module 118(A)-8 can prepare a report indicating the number of times each fraud detection rule was triggered by a transaction. It can further indicate the results of analyzed transactions (e.g. accepted, rejected, or sent for further review). In some embodiments of the invention, the reports module 118(A)-8 can present the full transaction details for each transaction received by the fraud detection system 118.

The currency conversion module 118(A)-9 may retrieve currency conversion tables from external data sources and use the retrieved currency conversion tables to convert transaction data received from the merchant computer 120. In some embodiments, the currency conversion module 118(A)-9 evaluates the transaction total contained in the transaction data, determines the currency of the transaction total, and converts the transaction total in another currency value. In some embodiments, the currency conversion module 118(A)-9 converts the transaction total into U.S. Dollars and into a local currency of the merchant. For example, if a merchant based in England has merchant websites in the United States and Japan, all of the transaction totals for the transactions received by the fraud detection system 118 would be converted into U.S. Dollars and British Pounds.

In some embodiments, the currency conversion module 118(A)-9 may retrieve the currency conversion tables from the external data sources at predetermined intervals. For example, the currency conversion module 118(A)-9 may retrieve the currency conversion tables once a day, every hour, every fifteen minutes, or at any other interval. In some embodiments, the currency conversion module 118(A)-9 may retrieve the currency conversion tables in real time as transactions are being evaluated by the transaction analyzer module 118(A)-4. The currency conversion module 118(A)-9 may store the retrieved currency conversion tables in the currency table database 118(F).

The user database 118(B) may be used by the server computer 118(A) to store authentication elements for users 112. For example, the user database 118(B) may contain a plurality of merchant IDs and associated user names authorized to access the corresponding merchant profile stored in the merchant profiles database 118(D) in the fraud detection system 118. The user database 118(B) may further store passwords associated with each merchant ID and user name authorized to access the fraud detection system 118.

The fraud rules database 118(C) may be used by the server computer 118(A) to store fraud detection rules that can be added to merchant profiles. In some embodiments, a merchant profile can be loaded with pre-existing rules contained in the fraud rules database 118(C). The fraud rules database 118(C) may further store new rules created by a user 112.

The merchant profiles database 118(D) may be used by the server computer 118(A) to store merchant profiles that are customized for each merchant that has created a profile with the fraud detection system 118. The merchant profile database 118(D) may further store fraud detection rules that have been created for a merchant and associated with a merchant profile.

The fraud rules modification database 118(E) may be used by the server computer 118(A) to store an audit log containing details regarding fraud detection rules, modifications made to the fraud detection rules, and the user name of the user 112 who made the modifications to the fraud detection rules. The data stored in the fraud rules modification database 118(E) may be stored by the rule modification module 118(A)-2 and may be searched by the audit search module 118(A)-5.

The currency table database 118(F) may be used to store currency conversion tables retrieved by the currency conversion module 118(A)-9. The currency conversion tables stored in the currency table database 118(F) may be accessed by the currency conversion module 118(A)-9 when transaction data is received by the fraud detection system 118. An exemplary currency conversion table that may be stored in the currency table database 118(F) is depicted in FIG. 10.

Returning now to FIG. 1 the user 112 can use the merchant client computer 114, which is communicatively coupled to the fraud detection system 118 via the communications medium 108 in order to access the fraud detection system 118. The merchant client computer 114 may be in any suitable form. Example of merchant client computers include any device capable of accessing the Internet, such as a personal computer, cellular or wireless phones, personal digital assistants (PDAs), tablet PCs, and handheld specialized readers. The merchant client computer 114 transmits data through the communications medium 116 to the fraud detection system 118. In some embodiments of the invention, the merchant computer 120 and the merchant client computer 114 may be a single device.

The merchant computer 120 may be comprised of various modules that may be embodied by computer code, residing on computer readable media. It may include any suitable computational apparatus operated by a merchant. Examples of merchant computers 120 may include an access device or an Internet merchant computer. The merchant computer 120 may be in any suitable form. Additional examples of merchant computers include any device capable of accessing the Internet, such as a personal computer, cellular or wireless phones, personal digital assistants (PDAs), tablet PCs, and handheld specialized readers. The merchant computer 120 transmits data through the communications medium 108 to the consumer client computer 106. In some embodiments of the invention, the merchant computer 120 receives transaction data from a consumer client computer 106 and transmits the transaction data to the merchant computer 120 for fraud evaluation and for further transaction authorization processes. The merchant computer 120 can further communicate with and/or receive input from a merchant client computer 114 operated by a user 112.

The merchant computer 120 may comprise a web server computer 120(A), comprising a country 1 website 120(A)-1, a country 2 website 120(A)-2, a country 3 website 120(A)-2, and a country N website 120(A)-N. In some embodiments, a merchant may have a greater or lesser number of country websites. The merchant computer 102 may also include a server computer 120(B) comprising an authorization module 120(B)-1, a transaction review module 120(B)-2, and a routing module 120(6)-3. The various modules may be embodied by computer code, residing on computer readable media.

The web server computer 120(A) may comprise one or more computational apparatuses and may use any of a variety of computing structures, arrangements, and compilations for servicing the requests from one or more client computers. The web server computer 120(A) may host one or more websites 120(A)-1 to 120(A)-N that can be accessed over a communications network, such as the Internet. The web server may be configured to deliver HyperText Markup Language (HTML) documents and additional content, such as graphics, media, and scripts. The web server computer 120(A) may be further configured to receive content from consumer client computers 106 and merchant client computer 114. The content received may include web forms, including transaction data, and files.

In some embodiments, the web server computer 120(A) may include the country 1 website 120(A)-1, the country 2 website 120(A)-2, the country 3 website 120(A)-2, and up to the country N website 120(A)-N. Each of the websites may be associated with a single merchant, and associated with transactions with merchants located in different countries. For example, the country 1 website 120(A)-1 may ship products from country 1 and conduct transactions with a currency associated with country 1. The country 2 website 120(A)-2 may ship products from country 2 and conduct transactions with a currency associated with country 2. The country 3 website 120(A)-2, up to the country N website 120(A)-N, may be similarly set up.

As noted above, the merchant computer 120 may have or operate at least a server computer 120(B). The server computer 120(B) may comprise one or more computational apparatuses and may use any of a variety of computing structures, arrangements, and compilations for servicing the requests from one or more client computers. In some embodiments, the server computer 120(B) may be coupled to a database and may include any hardware, software, other logic, or combination of the preceding for servicing the requests from one or more client computers.

The authorization module 120(B)-1 may generate and process authorization request and response messages. The authorization module 120(B)-1 may also determine the appropriate destination for the authorization request and response messages. An authorization request message is a message sent requesting that an issuer computer 126 authorize a financial transaction. An authorization request message may comply with International Standards Organization (ISO) 8583, which is a standard for systems that exchange electronic transactions made by consumers using payment devices. An authorization request message according to other embodiments may comply with other suitable standards. In some embodiments of the invention, an authorization request message may include, among other data, a Primary Account Number (PAN) and expiration date associated with a payment device (e.g. credit/debit card) of the consumer, amount of the transaction (which may be any type and form of a medium of exchange such a money or points), and identification of a merchant (e.g. merchant ID). In some embodiments, an authorization request message is generated by a server computer (if the transaction is an e-commerce transaction) or a Point of Sale (POS) device (if the transaction is a brick and mortar type transaction) and is sent to an issuer computer 126 via a payment processing network 124 and an acquirer computer 122.

The transaction review module 120(B)-2 may conduct a fraud evaluation for transactions. If the transaction review module 120(B)-2 determines that the transaction may be fraudulent, the transaction review module 120(B)-2 may determine that the transaction should be denied. If the transaction review module 120(B)-2 determines that the transaction is not fraudulent, the transaction review module 120(6)-2 may determine that the transaction should be allowed. If the transaction review module 120(B)-2 is unable to determine whether the transaction is fraudulent, the transaction review module 120(B)-2 can send the transaction for further review.

The routing module 120(B)-3 can route transactions to the appropriate destination. If a transaction is determined to be not fraudulent, the routing module 120(B)-3 can route the message to the acquirer computer 122 for further processing. If the transaction is determined to be fraudulent, the routing module 120(B)-3 can send the transaction back to the merchant. If the fraud evaluation conducted by the transaction review module 120(B)-2 is indeterminate (e.g. unable to determine whether the transaction is fraudulent or not fraudulent), the transaction can be routed to a higher level review by an individual. In other embodiments, the routing module 120(B)-3 may route authentication response messages to the fraud detection system 118 for review against a set of fraud detection rules established by the merchant.

An acquirer computer 122 is typically a system for an entity (e.g. a bank) that has a business relationship with a particular merchant or other entity. An issuer computer 126 is typically a business entity (e.g. a bank) which maintains financial accounts for the consumer 102 and often issues a consumer payment device 104 such as a credit or debit card to the consumer 102. Some entities can perform both issuer computer 126 and acquirer computer 122 functions. Embodiments of the invention encompass such single entity issuer-acquirers.

Figure 3:
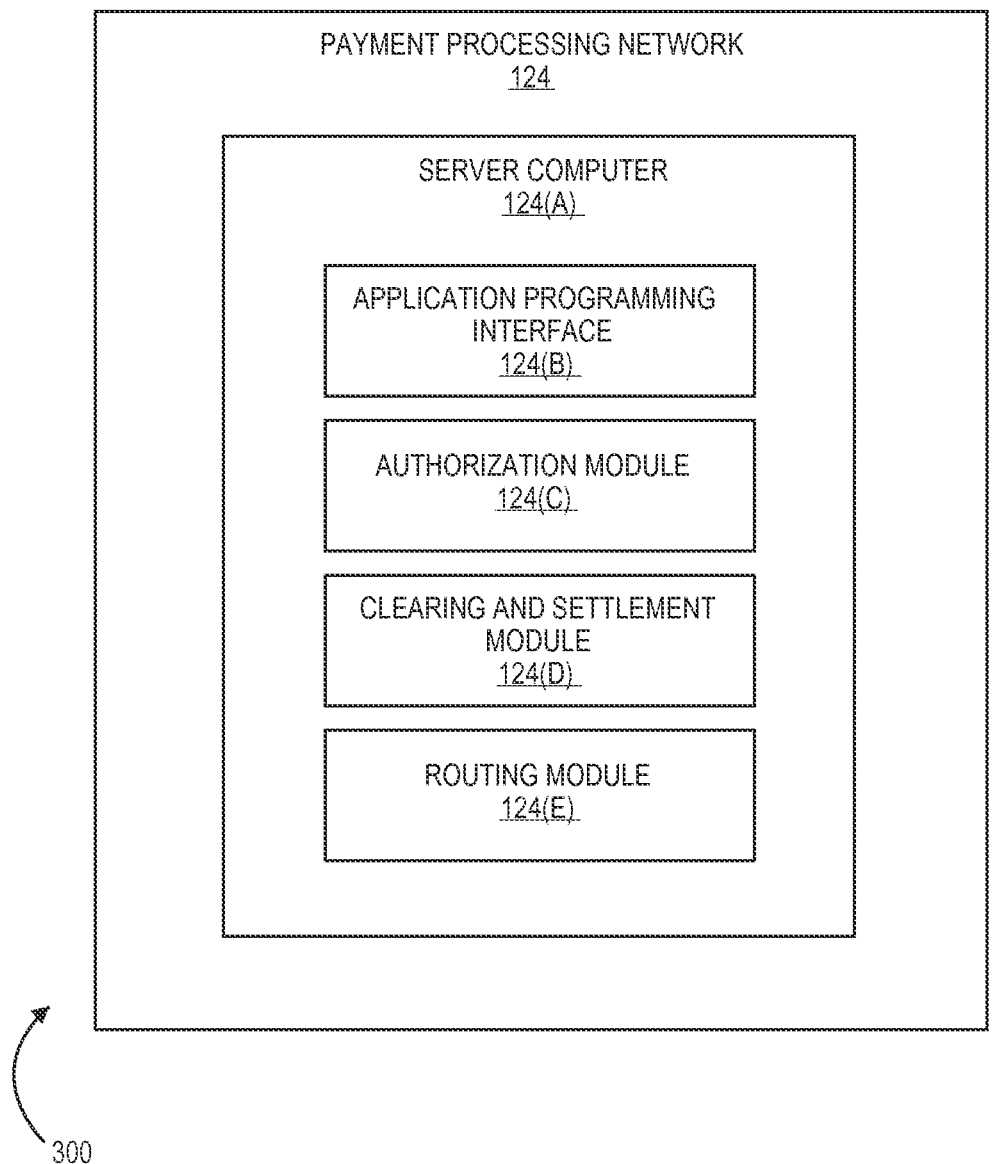
FIG. 3 shows a block diagram of components of a payment processing network according to an embodiment of the invention.

As depicted in FIG. 3, the payment processing network 124 may comprise a server computer 124(A) comprising an application programming interface 124(B), an authorization module 124(C), a clearing and settlement module 124(D), and a routing module 124(E). The various modules may be embodied by computer code, residing on computer readable media.

As noted above, the payment processing network 124 may have or operate at least a server computer 124(A). In some embodiments, the server computer 124(A) may be coupled to a database and may include any hardware, software, other logic, or combination of the preceding for servicing the requests from one or more client computers. The server computer 124(A) may comprise one or more computational apparatuses and may use any of a variety of computing structures, arrangements, and compilations for servicing the requests from one or more client computers.

The payment processing network 124 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system which processes authorization requests and a Base II system which performs clearing and settlement services. The payment processing network 124 may use any suitable wired or wireless network, including the Internet.

The authorization module 124(C) processes authorization request messages and determines the appropriate destination for the authorization request messages. The clearing and settlement module 124(D) handles the clearing and settlement of transactions. These modules authenticate user information and organize the settlement process of user accounts between the acquirer computer 122 and the issuer computer 126. An example of the clearing and settlement module is Base II, which provides clearing, settlement, and other interchange-related services to Visa members.

The routing module 124(E) handles the routing of authorization request messages from the acquirer computer 122 to the issuer computer 126, and the routing the authorization response messages back from the issuer computer 126 to the acquirer computer 122.

II. Methods

Methods according to embodiments of the invention can be described with respect to FIGS. 1-11.

Figure 4:
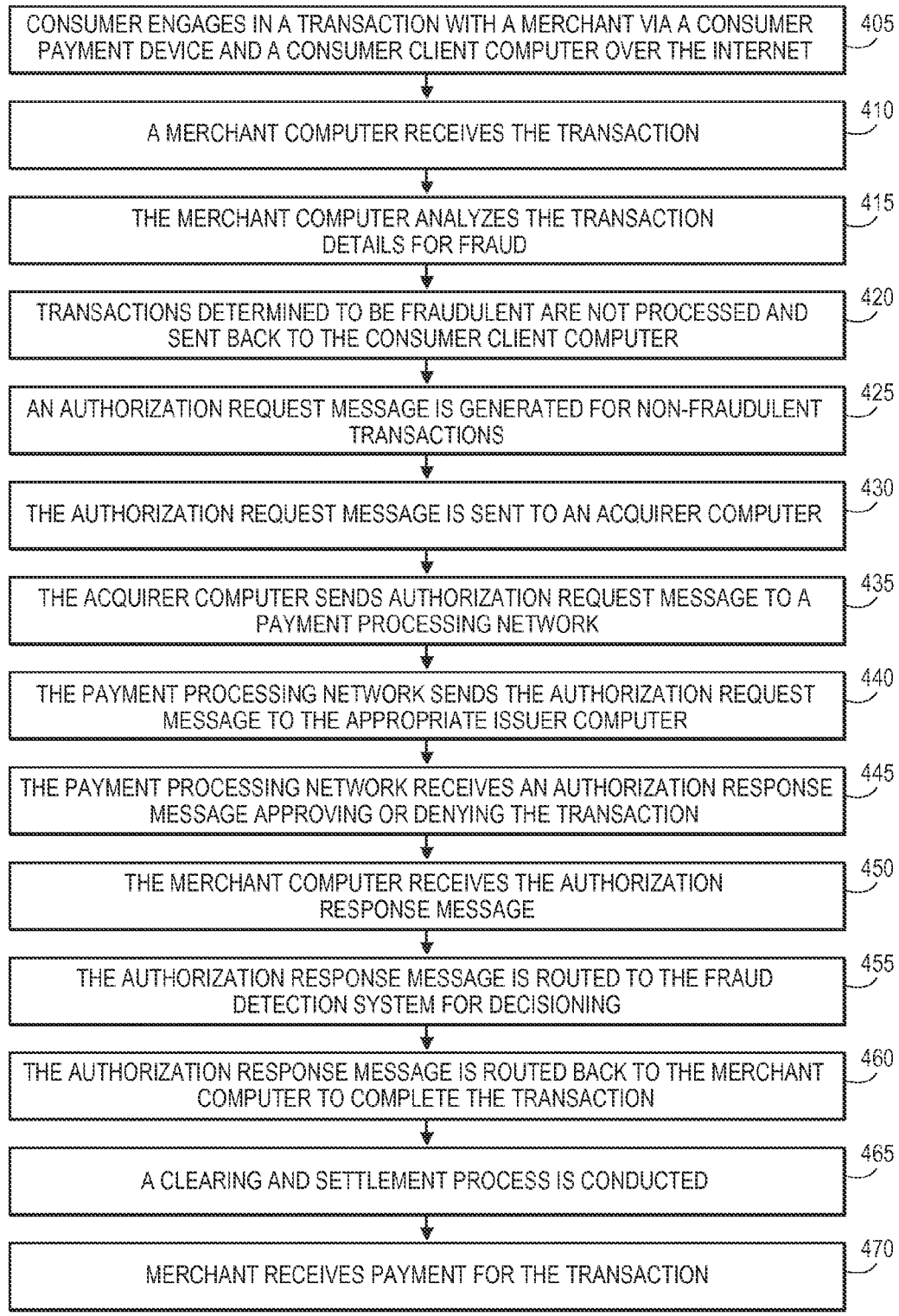
FIG. 4 illustrates a flowchart describing the process of a financial transaction according to an embodiment of the invention.

FIG. 4 is a flowchart of a method 400 for processing a transaction through a system 100 shown in FIG. 1.

In step 405, a consumer 102 engages in a transaction with a merchant via a consumer payment device 104 and a consumer client computer 106 over the Internet. In a typical transaction, the consumer 102 engages in a transaction for goods or services at a merchant associated with a merchant computer 120 using a consumer client computer 106 and a consumer payment device 104 such as a credit card or mobile phone. For example, the consumer 102 may use their Internet-enabled mobile phone to access a merchant website to conduct a transaction using their consumer payment device 104. In other embodiments, the consumer 102 may swipe the credit card through a POS terminal or, in another embodiment, may take a wireless phone and may pass it near a contactless reader in a POS terminal.

In step 410, a merchant computer 120 receives the transaction. The received transaction may include transaction data, which may be comprised of, but is not limited to, the following: consumer name, consumer billing address, consumer shipping address, consumer phone number, consumer payment method, consumer account number, items purchased, item prices, transaction total, etc.

In step 415, the merchant computer 120 analyzes the transaction details for fraud. In some embodiments, the merchant computer 120 may conduct a fraud analysis and determine whether the transaction should proceed or whether it should be rejected and returned to the merchant computer 120. The merchant computer 120 may use the transaction details in determining whether the transaction may be fraudulent. In some embodiments, the analysis of the transaction details is conducted by the transaction review module 120(B)-2 in the merchant computer 120.

In step 420, transactions determined to be fraudulent are not processed and are sent back to the consumer client computer 106. In some embodiments, if the merchant computer 120 determines that the transaction details indicate that the transaction may be fraudulent, the merchant computer 120 may not continue processing the transaction. In such embodiments, the merchant computer 120 may return the transaction to the consumer client computer 106 indicating that the transaction has not been successfully processed.

In step 425, an authorization request message is generated for non-fraudulent transactions. In some embodiments, if the merchant computer 120 determines that the transaction details indicate that the transaction is not fraudulent, an authorization request message may then be generated. The authorization request message may be generated in any suitable format and may include, at least, the transaction details for the transaction with the consumer 102. In some embodiments, the authorization module 120(B)-1 in the merchant computer 120 generates the authorization request message.

In step 430, the authorization request message is sent to an acquirer computer 122. The generated authorization request message may be transmitted by the merchant computer 120 to an acquirer computer 122. The authorization request message may be transmitted in any suitable format. In some embodiments, the routing module 120(B)-3 in the merchant computer 120 routes the authorization request message to the appropriate acquirer computer 122.

In step 435, the acquirer computer 122 sends the authorization request message to a payment processing network 124. In some embodiments, the acquirer computer 122 receives the authorization request message, and then transmits the authorization request message to the appropriate payment processing network 124.

In step 440, the payment processing network 124 sends the authorization request message to the appropriate issuer computer 126. After receiving the authorization request message, the payment processing network 124 may evaluate the authorization request message. The routing module 124(E) may determine the appropriate issuer computer 126 associated with the consumer payment device 104. The routing module 124(E) may then transmit the authorization request message to an appropriate issuer computer 126 associated with the consumer payment device 104.

In step 445, the payment processing network 124 receives an authorization response message. In some embodiments, the issuer computer 126 receives the authorization request message and may then determine whether the transaction should be authorized. The issuer computer 126 generates and transmits the authorization response message corresponding to the authorization request message, back to the payment processing network 124. The authorization response message can indicate whether or not the current transaction has been authorized or has been rejected.

In step 450, merchant computer 120 receives the authorization response message. In some embodiments, the routing module 124(E) in the payment processing network 124 may then transmit the authorization response message back to the acquirer computer 122. The acquirer computer 122 may then transmit the authorization response message back to the merchant computer 120.

In step 455, the authorization response message is routed to the fraud detection system 118 for decisioning. In some embodiments, the routing module 120(B)-3 in the merchant computer 120 may transmit the authorization response message to the fraud detection system 118. The fraud detection system 118 may then undertake a decision process based on the authorization response message. If the result from the fraud detection system 118 is an "ACCEPT", the transaction between the merchant and the consumer 102 can be completed. If the result from the fraud detection system 118 is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In some embodiments of the invention, the message does not indicate that a "REJECT" was determined for the transaction as the consumer 102 may be attempting to conduct fraudulent transactions. If the result from the fraud detection system 118 is a "REVIEW", the fraud detection system 118 would "hold" the transaction until it can be further reviewed, and it is determined whether it should be accepted or rejected. Additional details of the decision process conducted by the fraud detection system 118 is described with respect to FIG. 11

In step 460, the authorization response message is routed back to the merchant computer 120 to complete the transaction. In some embodiments, the decision determined by the fraud detection system 118 may also be transmitted to the merchant computer with the authorization response message. After the merchant computer 120 receives the authorization response message, the merchant computer 120 may then determine how to continuing processing the transaction. If the decision from the fraud detection system 118 was "ACCEPT", the merchant computer 120 may continue processing the transaction with the consumer 102. For example, the consumer 102 may be presented with a screen on the consumer client computer 106 indicating success or failure of authorization. In other embodiments, the authorization response message may be displayed by the POS terminal, or may be printed out on a receipt. If the decision the fraud detection system 118 was "REJECT", the merchant computer 120 may choose to cancel the transaction, or alternatively, continue processing the transaction with the consumer 102.

In step 465, a clearing and settlement process is conducted. In some embodiments, at the end of the day or at a period determined by the merchant, a standard clearing and settlement process can be conducted. A clearing and settlement process may include a process of reconciling a transaction. A clearing process is a process of exchanging financial details between an acquirer computer 122 and an issuer computer 126 to facilitate posting to a party's account and reconciliation of the party's settlement position. Settlement involves the delivery of securities from one party to another. In some embodiments, clearing and settlement can occur simultaneously. In other embodiments, the clearing and settlement process can be conducted by the fraud detection system 118 once the fraud detection system 118 has determined that the transaction should be accepted.

In step 470, the merchant receives payment for the transaction. In some embodiments, once the clearing and settlement process has been successfully completed, the funds for the transaction are credited to an account associated with the merchant.

Figure 5:
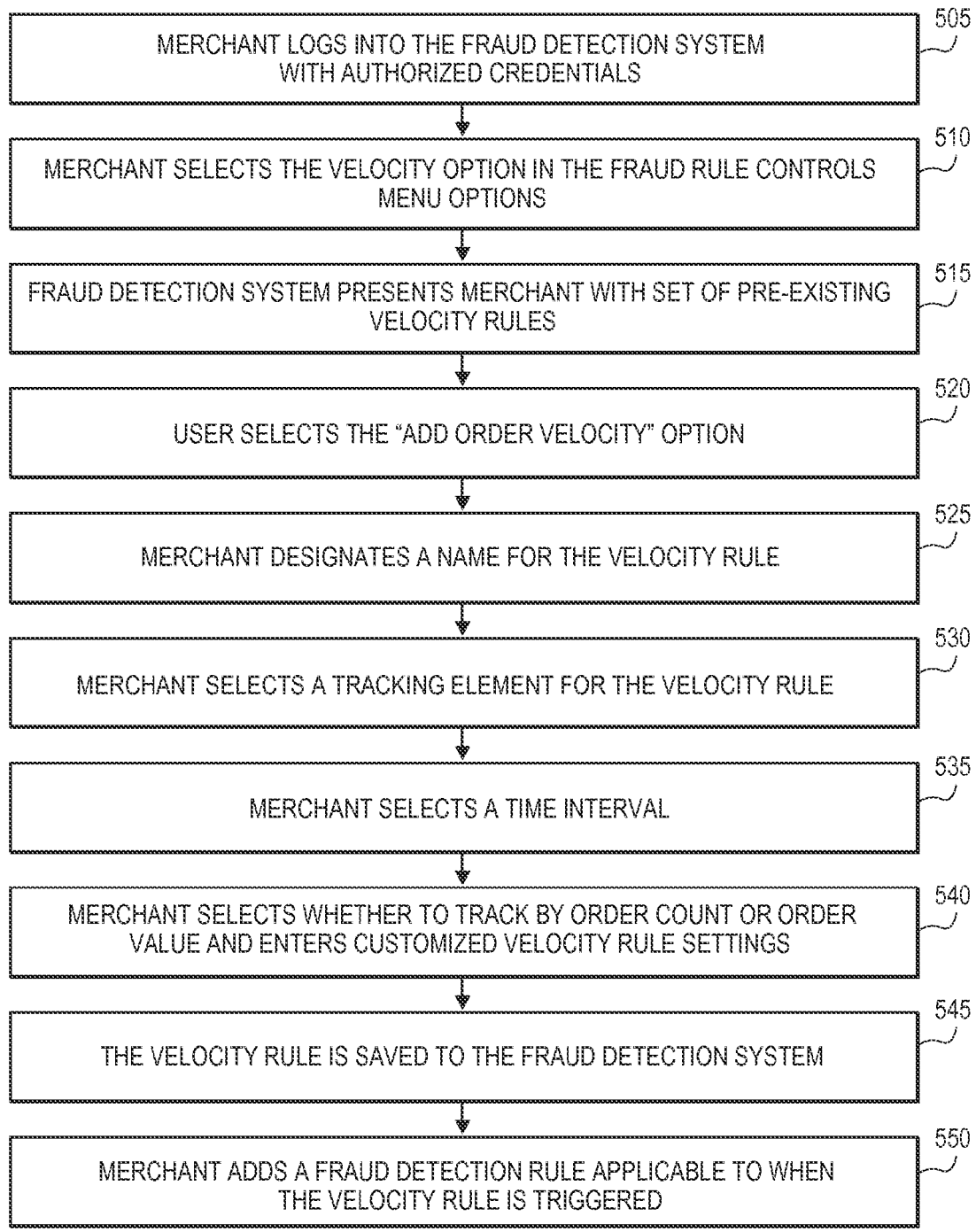
FIG. 5 illustrates a flowchart describing the process or establishing an order velocity rule, according to an embodiment of the invention.

FIG. 5 is a flowchart of a method 500 for establishing a fraud detection rule in the form of a velocity rule and saving the velocity rule in a merchant profile through a system shown in FIGS. 1 and 2. In some embodiments, the fraud detection rule can be a rule for a maximum transaction total allowed. In some embodiments, the fraud detection rule can be a rule for a maximum number of transactions over a predetermined amount for a predetermined period of time.

In step 505, a merchant logs into the fraud detection system 118 with authorized credentials. In embodiments of the invention, the fraud detection system 118 authenticates the identity of the user 112 prior to permitting the user 112 to make modifications to a selection of fraud detection rules by verifying a login ID and password of the user 112. In embodiments, the fraud detection system 118 accesses a user authentication module 118(B) in order to authenticate the user 112. The user 112 may be a merchant, the individual who established the merchant profile or an employee of the merchant who has been given access to the fraud detection system 118. The user 112 may be an individual who has fraudulently obtained authorized credentials in order to modify the merchant profile and fraud detection rules associated with the merchant profile in order to facilitate fraudulent activity (e.g. fraudulent transactions).

Figure 6:
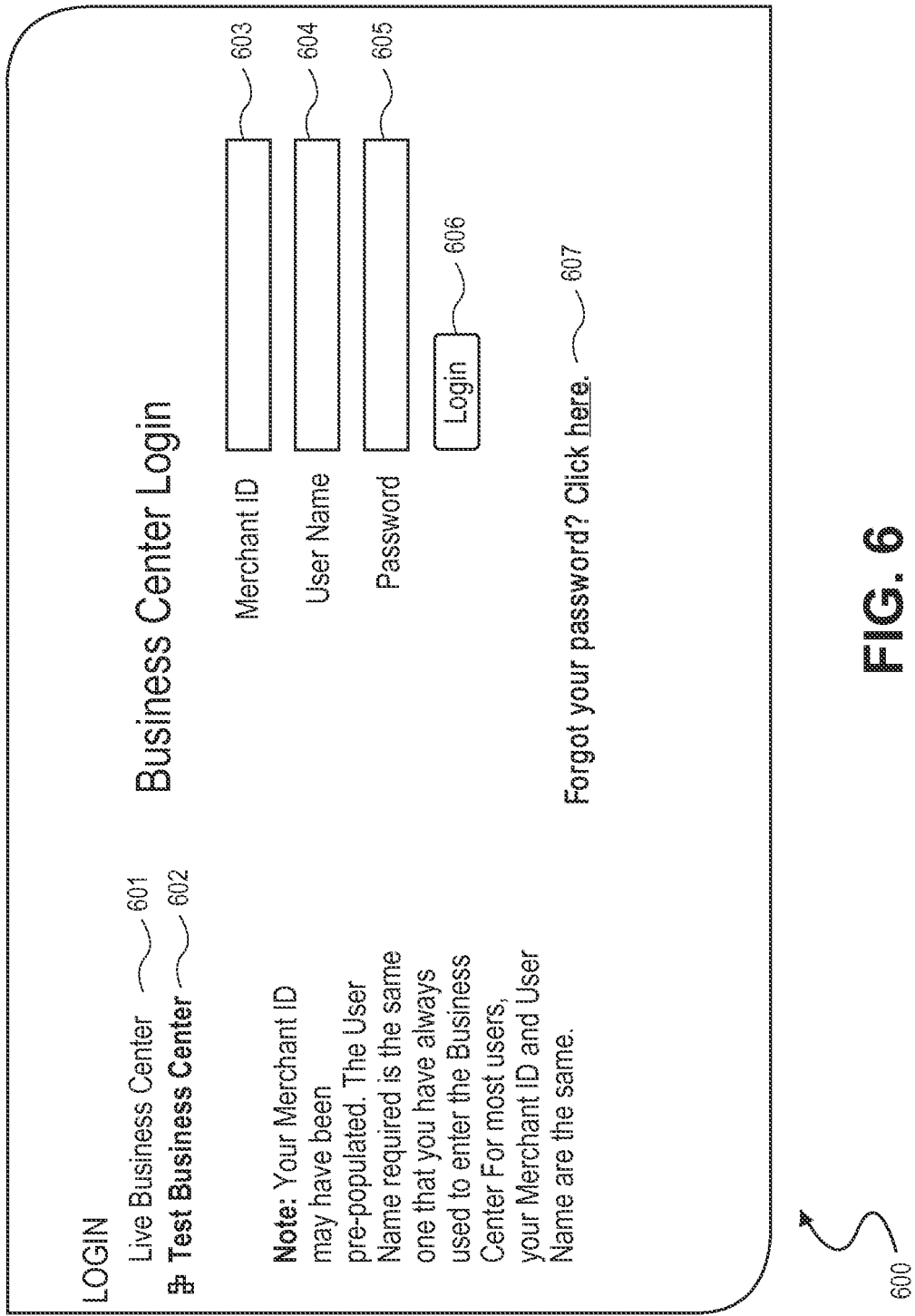
FIG. 6 shows a depiction of a user login page according to an embodiment of the invention.

FIG. 6 depicts an exemplary user login screen 600 according to an embodiment of the invention. A user 112 is provided the option of accessing either a Live Business Center 601 or accessing a Test Business Center 602. Selecting the Live Business Center 601 allows the user 112 to log into a real-time run environment where actual transactions are run through the fraud detection system 118. Selecting the Test Business Center 602 allows the user 112 to log into a test environment that the user 112 can utilize to run test or simulated transactions through the fraud detection system 118.

In order to access the fraud detection system 118, the user 112 must enter authorized credentials when prompted with the login screen 600. The authorized credentials are entered in a Merchant ID field 603, a User Name field 604, and a Password field 605. Once the fields have been filled, the user 112 can select the "Login" button 606 for the credentials to be authorized. If the user 112 has forgotten their password, the user 112 can access a password recovery process by selecting the hyperlink 607.

In step 510, the merchant selects the velocity option from the Fraud Rule Controls menu 704. In some embodiments, when the user 112 selects the velocity option, the user 112 is the taken to a Velocity Rules page. An exemplary Velocity Rules page is depicted in FIG. 7.

Figure 7:
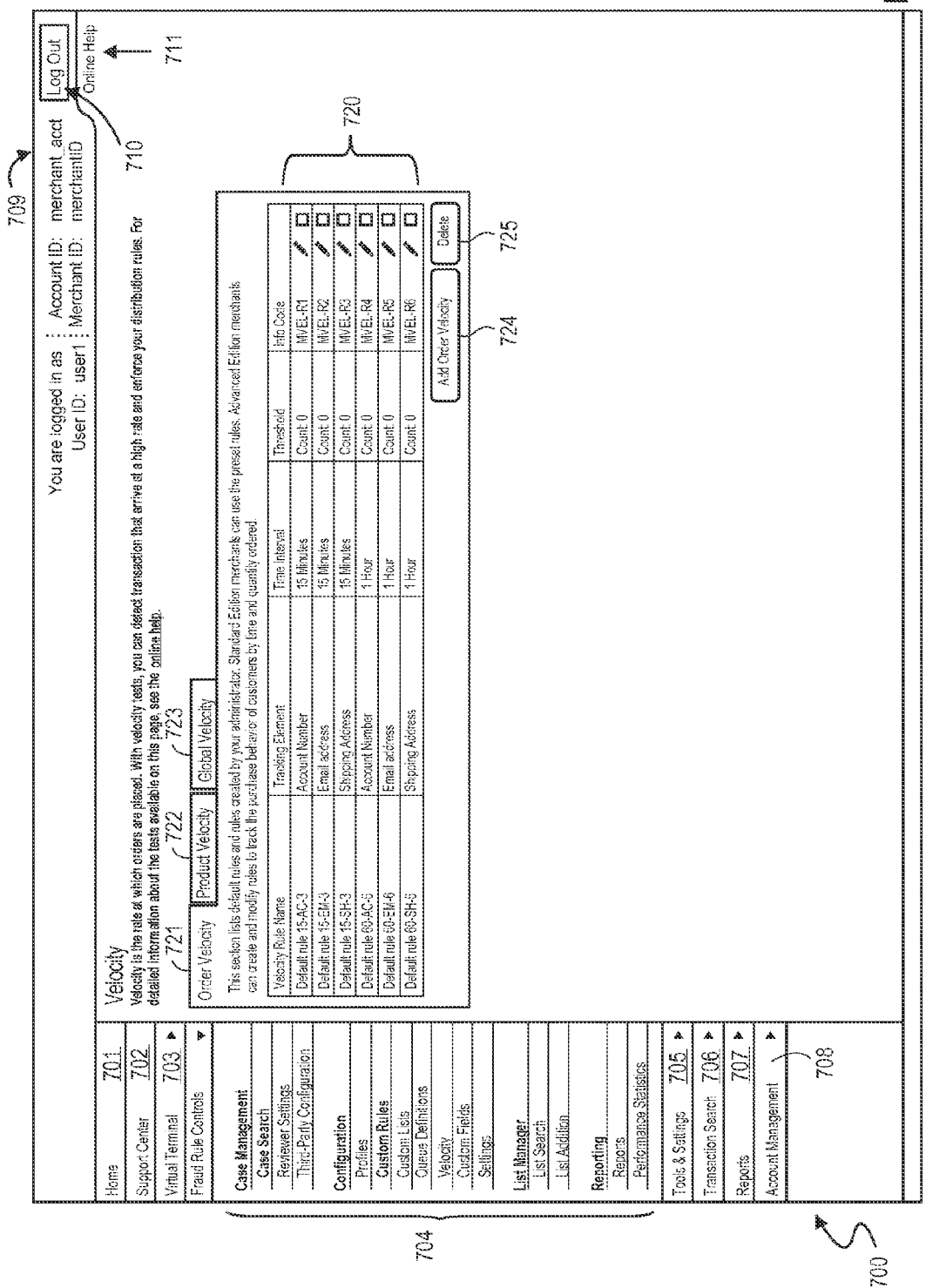
FIG. 7 shows a depiction of a velocity rules page according to an embodiment of the invention.

FIG. 7 also depicts the screen 700 when a user 112 selects the "Velocity" option from the menu options. The left-column menu includes a selection of options for using the fraud detection system 118. Selecting the "Home" 701 option takes the user 112 to the home screen of the fraud detection system 118. Selecting the "Support Center" 702 option takes the user 112 to the Help and Support Center for the fraud detection system 118. Selecting the "Virtual Terminal" 703 option takes the user 112 to a page that the user 112 can use to simulate transactions to test the fraud detection system 118. Selecting the "Fraud Rule Controls" 704 option takes the user 112 to the fraud detection rules and merchant profile settings and controls. There the user can add, modify, or delete, fraud detection rules and/or merchant profiles. Selecting the "Tools & Settings" 705 option takes the user 112 to a variety of tools that the user 112 can use with the fraud detection system 118. Selecting the "Transaction Search" 706 option takes the user 112 to a search page that the user 112 can utilize to conduct searches for specific transactions. Selecting the "Reports" 707 option takes the user 112 to the Reports page that allows the user 112 to review different activity compiled by the fraud detection system 118 in specialized and customizable reports. Selecting the "Account Management" 708 option takes the user 112 to a variety of administrative functions including the "Audit Search" function.

The "Velocity" screen may include tabs that may be selected to review different types of velocity rules. The types of velocity rules may include "Order Velocity" 721, "Product Velocity" 722, and "Global Velocity" 723. Additional information and options displayed on the search screen 700 include the login information section 709 containing the user ID, account ID, and merchant ID. The user 112 can log out of the fraud detection system 118 by selecting the "Log Out" option 710. If the user 112 wants additional help, the user 112 can select the "Online Help" option 711. As shown in FIG. 7, options on the Velocity Rules screen 700 include the option for the merchant to "Add Order Velocity" 724 and "Delete" 725. The "Add Order Velocity" button 724 gives the merchant the ability to add new velocity rules to the fraud detection system 118. The "Delete" button 725 gives the merchant the ability to delete one or more velocity rules from the fraud detection system 118. In some embodiments, deleting a velocity rule only deletes the velocity rule from the merchant's merchant profile and not from the entire fraud detection system 118.

In step 515, the fraud detection system 118 presents the merchant with a set of pre-existing velocity rules. In embodiments of the invention, the pre-existing (or default) velocity rules are provided by a server computer 118(A) in the fraud detection system 118. In embodiments, the velocity rules are received at a merchant client computer 114. In embodiments, the velocity rules are retrieved from the fraud rules database 118(C) and transmitted to the merchant client computer 114 from the server computer 118(A) by the display module 118(A)-7. Each velocity rule comprises of at least one condition for triggering the velocity rule. The set of default velocity rules are depicted in the velocity rules 720 in FIG. 7. Other embodiments may include more default velocity rules, fewer, or the same number as those depicted in FIG. 7. The first default velocity rule, named "Default Rule 15-AC-3" tracks a specific account number used in transactions with the merchant. If more than 3 transactions using the specific account number are received within a 15 minute time interval, the velocity rule is triggered. The second default velocity rule, named "Default Rule 15-EM-3" tracks a specific email address used in transactions with the merchant. If more than 3 transactions using the specific email address are received within a 15 minute time interval, the velocity rule is triggered. The third default velocity rule, named "Default Rule 15-SH-3" tracks a specific shipping address used in transactions with the merchant. If more than 3 transactions using the specific shipping address are received within a 15 minute time interval, the velocity rule is triggered. The three remaining rules are similar to the previous three, but does not trigger unless greater than six transactions matching the criteria are received over a one hour time interval with the same tracking element.

In embodiments of the invention, the merchant can use the default velocity rules provided by the fraud detection system 118 rather than create new velocity rules. The selection of velocity rules may be velocity rules provided by the fraud detection system 118, velocity rules created by the merchant, or a combination of both.

In step 520, the merchant selects the "Add Order Velocity" option in order to add a new velocity rule to the fraud detection system 118. In some embodiments, when the merchant selects "Add Order Velocity," the fraud detection system 118 presents the merchant with an Order Velocity Editor page, as depicted in FIG. 8.

Figure 8:
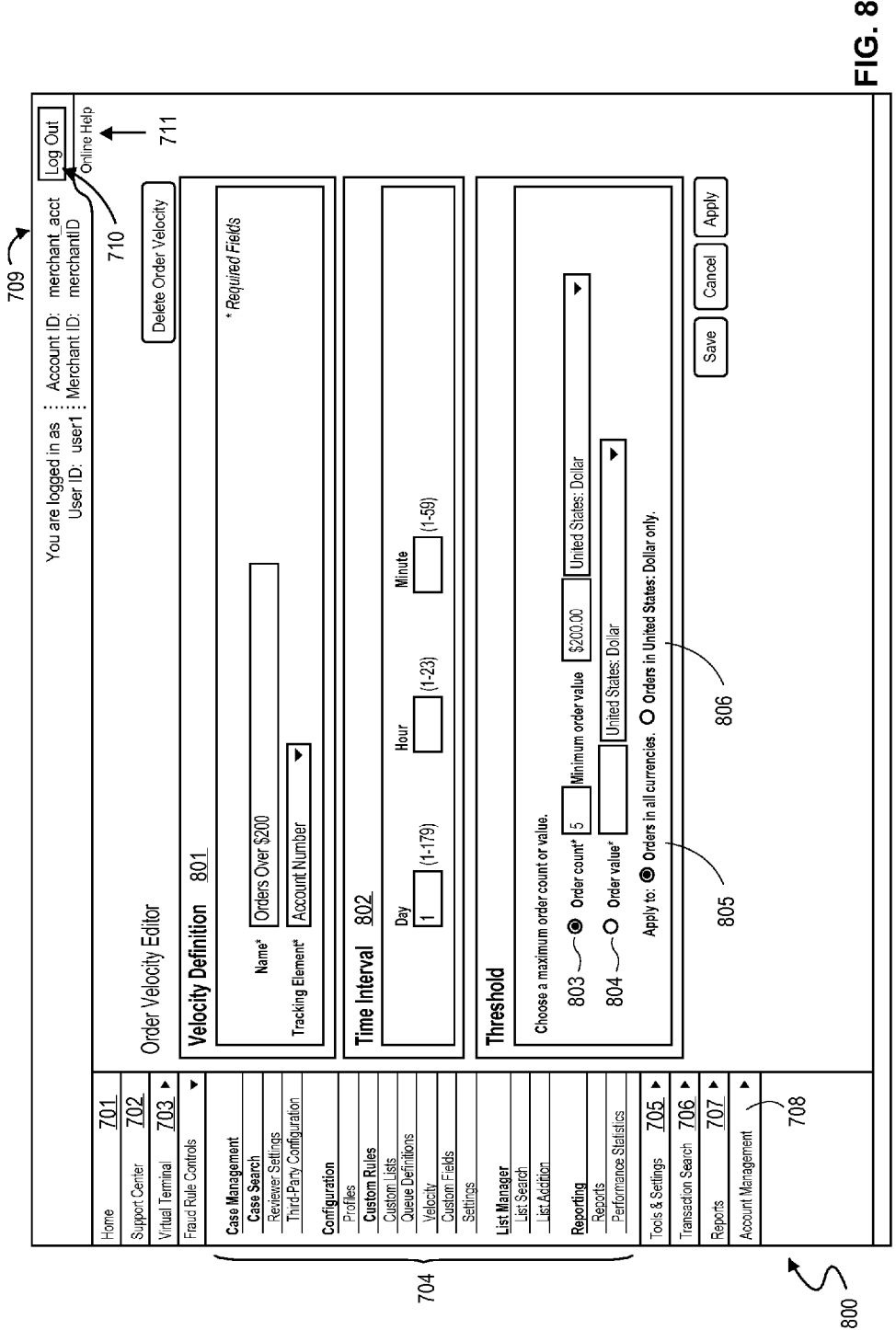
FIG. 8 shows a depiction of features of an order velocity rule editor page according to an embodiment of the invention.

FIG. 8 also depicts the screen 800 when a merchant selects the "Add Order Velocity." The merchant is presented with "Velocity Definition" options 801, "Time Interval" options 802, and "Threshold" options. The "Velocity Definition" options 801 may include the options to enter a name for the velocity rule and establish a tracking element for the velocity rule. The "Time Interval" options 802 may include the options to set the velocity rule to monitor transactions over a specific time intervals, in terms of days, hours and/or minutes. The "Threshold" options may include the option to establish a velocity rule based on "Order Count" 803 or "Order Value" 804.

The "Order Count" option 803 allows the merchant to set a maximum number of transactions before the velocity rule is triggered. For example, if the order count for a velocity rule is 4, and the minimum order value is $20, the first four transactions over $20 would not trigger the rule. However, the fifth transaction over $20 would trigger the velocity rule.

The "Order Value" option 804 allows the merchant to set a maximum order value for transaction before the velocity rule is triggered. For example, if the order value for the velocity rule is $100, any transactions under $100 would not trigger the rule. However, any transactions over $100 would trigger the velocity rule.

In some embodiments, the "Order Count" option 803 and "Order Value" option 804 can be used in conjunction with other currencies. For example, although a rule may be established for transactions over $100, in U.S. Dollars, by selecting the "Orders in all currencies" option 805, the fraud detection system 118 will evaluate all transactions received by the fraud detection system. In some embodiments, the merchant also has the option to monitor transactions in only a single currency by selecting the "Orders in United States: Dollar only" option 806, where the country and currency type are based on the currency selection for the "Order Count" option 803 and "Order Value" option 804.

In step 525, the merchant designates a name for the velocity rule. As shown in FIG. 8, the name entered into the "Velocity Definition" option 801 is shown as "Orders Over $200."

In step 530, the merchant selects a tracking element for the velocity rule. In some embodiments, tracking elements can include, but are not limited to, account number, billing address, shipping address, email address, device fingerprint, internet protocol (IP) address, phone number, and a custom field established by the merchant. As shown in FIG. 8, the tracking element entered into the "Velocity Definition" option 801 is shown as "Account Number."

In step 535, the merchant selects a time interval. The time interval option is one option that determines how the fraud detection system 118 will analyze the transaction data. The time interval option is a condition that is determinative in determining when velocity rule will be triggered. As shown in FIG. 8, the time interval entered into the "Time Interval" option 801 is shown as one day.

In step 540, merchant selects whether to track by order count or order values and enters customized velocity rule settings. The merchant may also select whether to include all currencies or a designated currency only. As show in FIG. 8, the "Order Count" option 803 allows the merchant to set a maximum number of transactions before the velocity rule is triggered and the "Order Value" option 804 allows the merchant to set a maximum order value for transaction before the velocity rule is triggered. In some embodiments, the merchant establishes a first value in a first currency for the fraud detection rule. As shown in FIG. 8, the option selected is "Order Count," the count value is 5, and the value entered is $200.00 U.S. Dollars. In this example, all transactions over $200 will be counted, and if the fraud detection system 118 receives more than 5 transactions in a day from the same account number, the velocity rule will be triggered. In the example in FIG. 8, the option to apply the velocity rule to orders in all currencies (i.e., option 805) has also been selected. In some embodiments, when this option is selected, all transactions regardless of the currency of the transaction total will be evaluated to determine if the velocity rule is applicable. In some embodiments, the merchant may apply the velocity rule to orders only in the first currency selected by the merchant (i.e. option 806). A currency conversion module 118(A)-9 will access a currency table database 118(F) and convert the transaction total into the appropriate currency for the velocity rule (e.g. U.S. Dollars in the described example).

Figure 9:
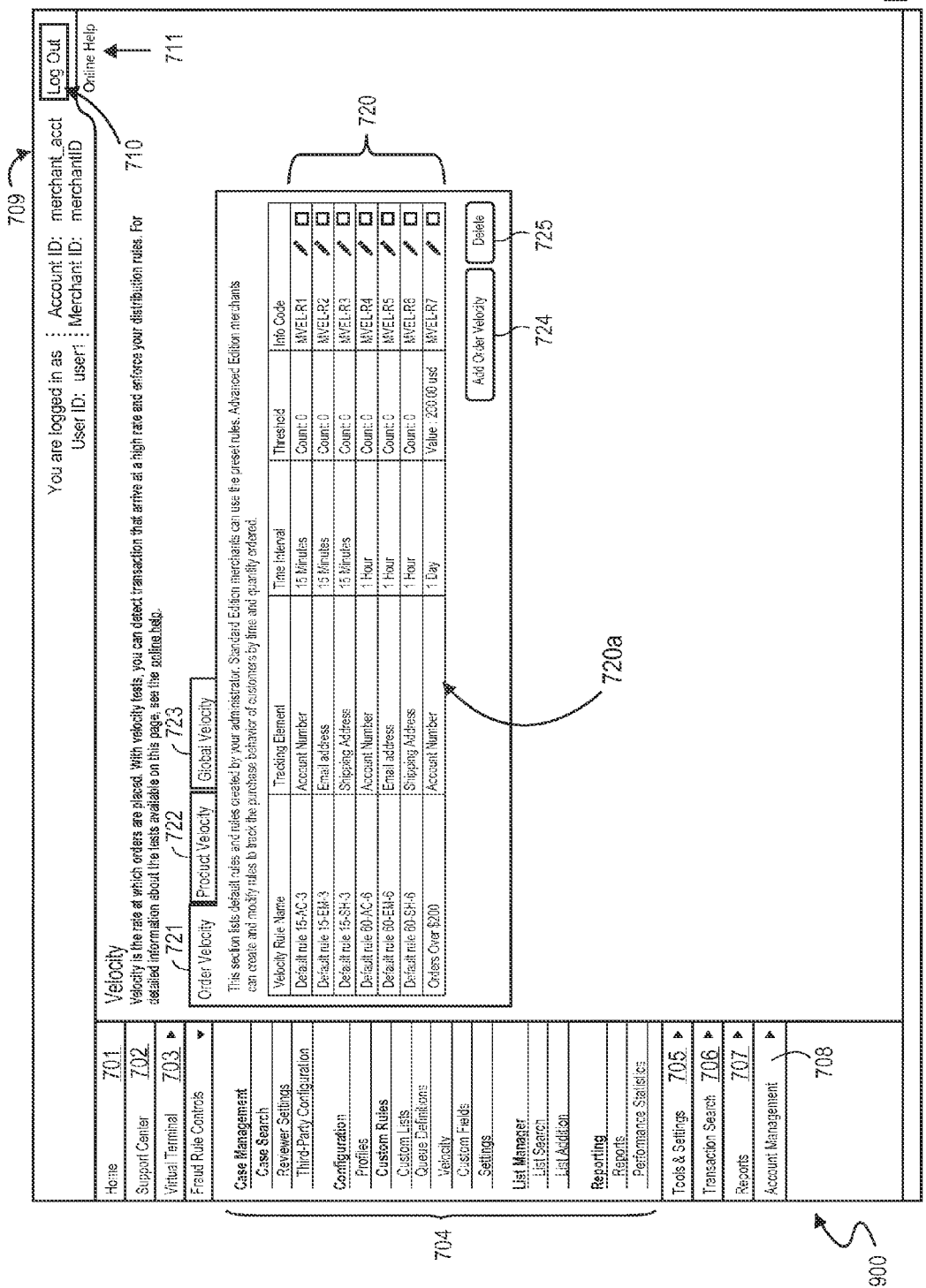
FIG. 9 shows a depiction of a modified velocity rules page according to an embodiment of the invention.

In step 545, the velocity rule is saved to the fraud detection system 118. In some embodiments, the velocity rule is added to the fraud rules database 118(C) and associated with a merchant profile. In other embodiments, the new fraud detection rule may be stored in a merchant profile associated with the merchant in the merchant profiles database 118(D). Once the new velocity rule has been stored to the fraud detection system 118, the velocity rule is displayed in the set of velocity rules 720 in FIG. 9 as rule 720*a*. The Velocity Rules page 900 shown in FIG. 9 shows that the "Orders Over $200" rule created by the merchant is in the set of velocity rules 720.

In step 550, the merchant adds a fraud detection rule applicable to when the velocity rule is triggered. Details on adding a fraud detection rule to the fraud detection system 118 are described in co-pending U.S. patent application Ser. No. 13/458,910, titled "FRAUD DETECTION SYSTEM AUTOMATIC RULE POPULATION ENGINE," filed Apr. 27, 2012, and herein incorporated by reference in its entirety for all purposes.

In some embodiments, the merchant may add a fraud detection rule that determines what action to take when a velocity rule is triggered. For example, a fraud detection rule may be created with the condition that if "Orders Over $200" rule velocity rule is triggered, the fraud detection system 118 will transmit a "REJECT" message when the authorization response message is sent back to the merchant computer 120.

Figure 11:
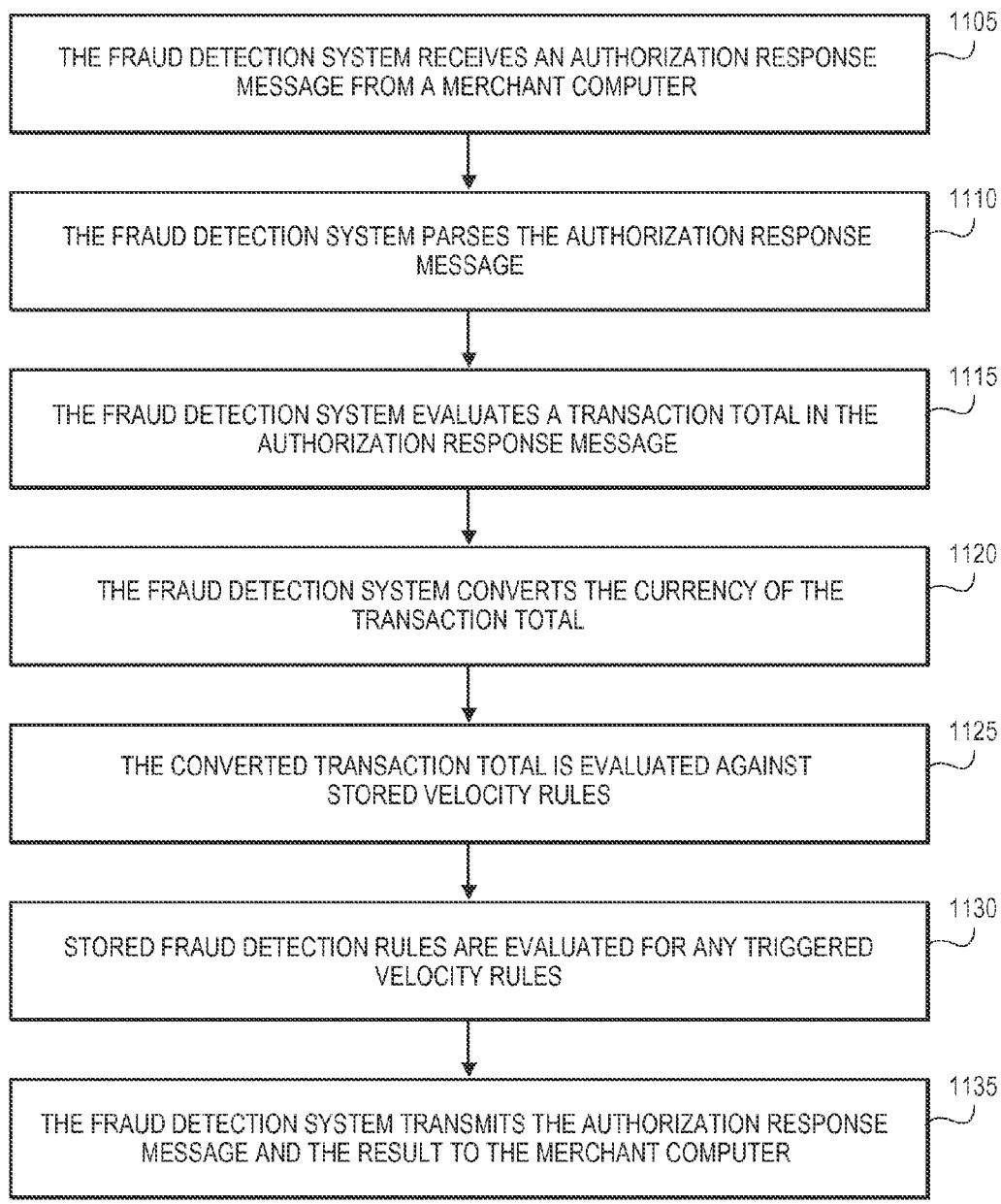
FIG. 11 illustrates a flowchart describing the operation of the system processing an authorization response message through a system according to an embodiment of the invention.

FIG. 11 is a flowchart of a method 1100 for evaluating transaction data and performing a currency conversion process on the transaction data in a system shown in FIGS. 1 and 2. In some embodiments, the fraud detection system 118 receives transaction data from the merchant computer 120. The method 1100 described in FIG. 11 describes transaction data contained in an authorization response message. Other embodiments of the invention include the fraud detection system 118 receiving transaction data through other means, including a transaction order form, merchant checkout page, and a query message containing transaction data.

In step 1105, the fraud detection system 118 receives an authorization response message from a merchant computer 120. In some embodiments, the authorization response message may be generated in a process as described with respect to FIG. 5. In some embodiments, the routing module 120(B)-3 in the merchant computer 120 may transmit the authorization response message to the fraud detection system 118.

In step 1110, the fraud detection system 118 parses the authorization response message. In some embodiments, a transaction analyzer module 118(A)-4 in the fraud detection system 118 receives the authorization response message and parses the authorization response message for transaction data. Transaction data may include, but is not limited to, specific transaction, including items purchased, item prices, transaction total, shipping address, billing address, account number, email address, payment methods, authentication data, merchant data, etc.

In step 1115, the fraud detection system 118 evaluates a transaction total in the authorization response message. The transaction analyzer module 118(A)-4 may extract the transaction total from the transaction data received from the merchant computer 120. In some embodiments, the transaction analyzer module 118(A)-4 may evaluate the transaction total to determine the currency type of the transaction total (e.g. the second currency). In some embodiments, the transaction analyzer module 118(A)-4 may determine that the received transaction total in the transaction data is in a second currency from the first currency included in the merchant's set of fraud detection rules.

In step 1120, the fraud detection system 118 converts the currency of the transaction total. In some embodiments, the transaction total may be in a different currency than the currency established for a particular velocity rule. For example, the merchant may be located in the United States, but host websites in one or more foreign countries where the transactions are processed in the native currencies. In such examples, the fraud detection system 118 may determine that there is a difference in currency between the merchant's velocity rules and the transaction total received in the authorization response message.

In some embodiments, when the difference in currency is detected, the currency conversion module 118(A)-9 may be accessed. In some embodiments, the fraud detection system 118 automatically determines a converted transaction total in the first currency, where the converted transaction total in the first currency is equivalent in value to the received transaction total. The currency conversion module 118(A)-9 may access a currency table database 118(F) and retrieve a currency conversion table. In some embodiments, the fraud detection system 118 receives the currency conversion table from an external source. An exemplary currency conversion table 1000 is depicted in FIG. 10. The currency conversion table 1000 depicts four currencies (U.S. Dollar, British Pound, Euro, and Japanese Yen). Other embodiments of the currency conversion table 1000 may include these currencies, or additional or fewer currencies.

For example, assuming the authorization response message includes a transaction total of £200.00 in British Pounds, the currency conversion module 118(A)-9 may retrieve the currency conversion table 1000, access the appropriate column (e.g. the "British Pound" column), determine the conversion rate to be 1.63:1 (U.S. Dollar:British Pound), and calculate the converted transaction total from the received transaction total in U.S. Dollars to be $326.00.

In some embodiments, the currency conversion module 118(A)-9 may convert the received transaction total into the merchant's preferred currency (e.g. the currency used for the merchant's fraud detection rules), as well as into U.S. Dollars. In such embodiments, this data can be used for generating reports and audit logs of the system and the efficiency of the fraud detection system 118.

In step 1125, the converted transaction total is evaluated against stored velocity rules. In some embodiments, the converted transaction total in the first currency is evaluated with the fraud detection rule established by the merchant, as described above with respect to FIG. 5. Once the received transaction total has been converted by the currency conversion module 118(A)-9, the converted transaction total may be evaluated against the stored velocity rules by the transaction analyzer module 118(A)-4. Assuming the converted transaction total is evaluated against the velocity rule created in the method 600 described previously, the converted transaction total would be counted as a transaction meeting the criteria of the velocity rule, as it has a total over $200. In some embodiments, the converted transaction total may match the criteria of one velocity rule, multiple velocity rules, or no velocity rules.

In step 1130, stored fraud detection rules are evaluated for any triggered velocity rules. In some embodiments, a velocity rule is triggered once the conditions of the velocity rule are satisfied. For example, the rule created in the method 600 is not triggered until the fraud detection system 118 receives more than five transactions from the same account number within a one hour period of time with a transaction total greater than $200. Thus, the first five transactions over $200 received from an account "X" will not trigger the velocity rule, but the sixth transaction over $200 received from account "X" will trigger the velocity rule. Stored fraud detection rules may be present in a merchant profile, where the stored fraud detection rules are configured to take an action once a velocity rule is triggered. For example, one fraud detection rule may state that once the "Orders Over $200" velocity rule is triggered, any transactions over $200 from the same account will be automatically rejected, and a "REJECT" message will be sent to the merchant computer 120. In another example, one fraud detection rule may not send a "REJECT" message unless the "Orders Over $200" velocity rule is triggered and another condition is satisfied (e.g. shipping to "San Francisco, Calif."). In this example, the fraud detection system 118 will not generate a "REJECT" response unless the velocity rule is triggered and the transaction includes a shipping address in San Francisco, Calif.

In some embodiments, the converted transaction total may be evaluated against a fraud detection rule by the transaction analyzer module 118(A)-4. In some embodiments, the converted transaction total being greater than the value in the velocity rule may be sufficient for determining that the transaction contained in the authorization response message should be rejected. In such embodiments, the velocity rule is sufficient to trigger generating a response, and the triggered velocity rule is not evaluated with any other fraud detection rules stored in the fraud detection system 118. In some embodiments, a counter associated with the velocity rule is incremented upon the velocity rule being triggered. In such embodiments, the counter may indicate the number of transactions that have triggered the velocity rule. The counter may then be evaluated with the set of fraud detection rules in the merchant profile to determine a decision for the transaction contained in the transaction data. For example, if the counter is greater than a maximum value in one or more fraud detection rules in the set of fraud detection rules, the fraud detection system 118 may determine whether the transaction should be accepted or rejected. In some embodiments, the fraud detection rule is triggered if the converted transaction total exceeds the first value set by the merchant in the fraud detection rule.

In step 1135, the fraud detection system 118 transmits the authorization response message and the result to the merchant computer 120. In some embodiments, the data output module 118(A)-6 may be used to transmit the authorization response message and the result of the evaluation of the fraud detection rules back to the merchant computer 120. In some embodiments, the fraud detection system 118 includes a message indicating whether the fraud evaluation has indicated the transaction should be accepted, rejected, or put on hold for further review. In some embodiments, once the merchant computer 120 receives the authorization response message and the result of the fraud evaluation by the fraud detection system 118, the merchant computer 120 can determine whether to proceed with the transaction or cancel the transaction. In some embodiments, the result of the evaluation of the converted transaction total with the fraud detection rules is provided to the merchant as a message. The message may be displayed on an Internet webpage or presented to the merchant in other manners, including in a generated message based on the evaluation of the converted transaction total with the fraud detection rule. In some embodiments, the generated message is transmitted by the fraud detection system 118 to the merchant computer 120.

III. Technical Benefits

Embodiments of the invention provide the technical benefits of efficiency and conservation of system resources. Previously, a merchant or user would be required to establish separate rules for each currency, which would be time-consuming as merchants may operate in a significant number of countries. This previous method would also require significantly more system resources as a merchant with a presence in 25 countries would have to set up a separate rule for each country. The capability of creating a single fraud detection rule in one currency which is applicable to all transactions in any other currencies recognized by the system saves a significant amount of resources in terms of storage and processing.

Another technical benefit with embodiments of the claimed invention is the reduction of fraud and the reduction in unnecessary transaction processing. By being able to set up a single fraud detection rule that can monitor transaction velocity over a large plurality of currencies, fraud can be more readily detected as all transactions are evaluated under the same rule. As fraud can be more readily detected, transactions that should not be processed may be detected and prevented from further processing. By eliminating fraud before a transaction is completed, the resources that would be required for chargebacks and canceling transactions would be reduced.

IV. Additional Embodiments

In other embodiments of the claimed invention, the transaction data may be sent in a query message. For example, a merchant may have transaction data for a transaction that has already been processed and completed, which the merchant may want to send to the fraud detection system for evaluation. In other embodiments, the transaction data may be sent by the merchant to the fraud detection system in the form of an order checkout page or an order form. In such embodiments, the fraud detection system would evaluate the transaction data in a similar manner as described above with respect to transaction data received in an authorization response message.

In other embodiments of the claimed invention, when the fraud detection system processes an authorization response message and determines that the transaction should be marked as "ACCEPT," the fraud detection system can facilitate the clearing and settlement process on behalf of the merchant. In such embodiments, the fraud detection system can streamline and more quickly conduct the clearing and settlement process rather than waiting until a predetermined time or the end of the business day for the merchant.

V. Exemplary Computer Apparatuses

Figure 12:
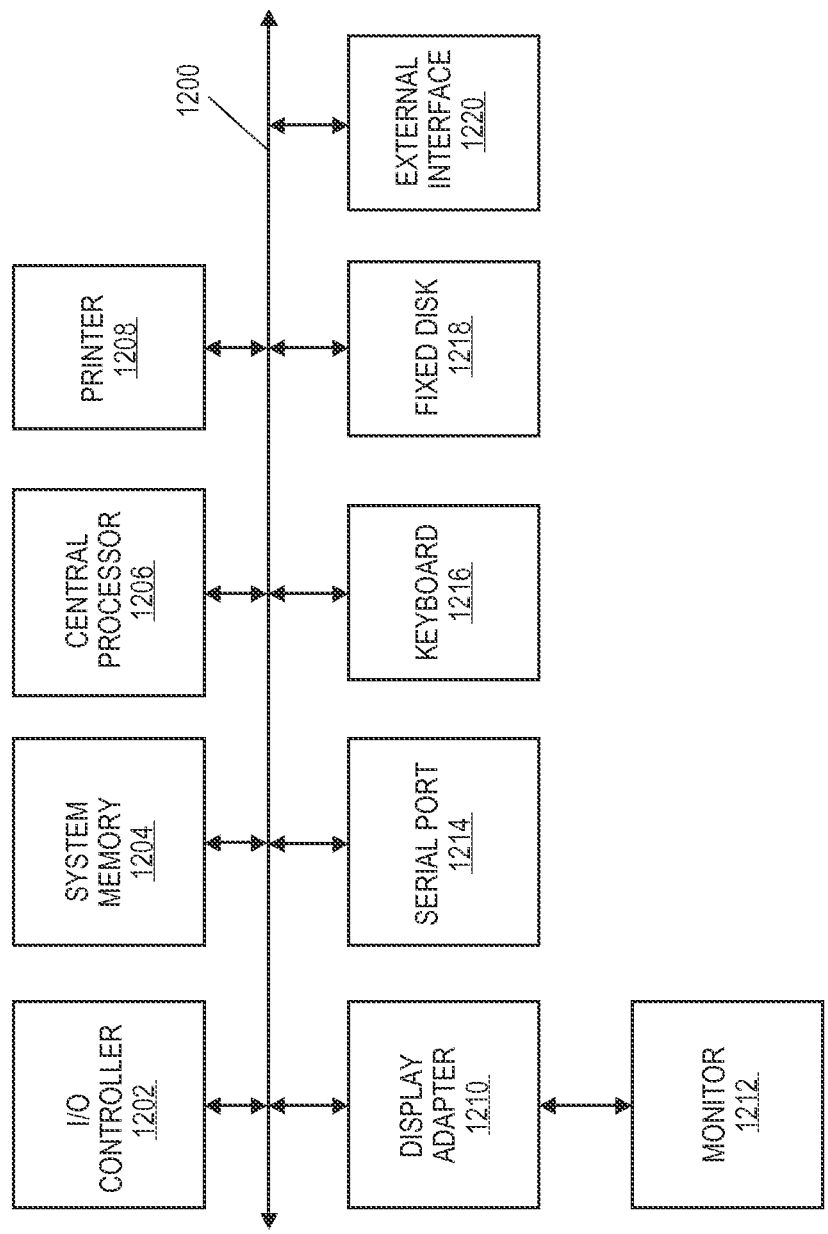
FIG. 12 shows a block diagram of a computer apparatus.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 12. The subsystems shown in FIG. 12 are interconnected via a system bus 1200. Additional subsystems such as a printer 1208, keyboard 1216, fixed disk 1218 (or other memory comprising computer readable media), monitor 1212, which is coupled to display adapter 1210, and others are shown. Peripherals and input/output (I/O) devices, which couple to I/O controller 1202, can be connected to the computer system by any number of means known in the art, such as serial port 1214. For example, serial port 1214 or external interface 1220 can be used to connect the computer apparatus to a wide area network such as the Internet, a mouse input device, or a scanner. The interconnection via system bus 1200 allows the central processor 1206 to communicate with each subsystem and to control the execution of instructions from system memory 1204 or the fixed disk 1218, as well as the exchange of information between subsystems. The system memory 1204 and/or the fixed disk 1218 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in some embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In some embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   providing, by a server computer, a user interface on a client computer for viewing and modifying a plurality of fraud detection rules for detecting fraudulent transactions;
   receiving, by the server computer, a first value in a first currency via the user interface on the client computer operated by a user;
   generating, by the server computer, a fraud detection rule using the received first value in the first currency;
   storing, by the server computer, the fraud detection rule and the first currency in a merchant profile;
   subsequent to storing the fraud detection rule, receiving, by the server computer, transaction data including a transaction total and a currency indicator;
   determining, by the server computer, that the currency indicator corresponds to a second currency that is different from the first currency stored in the merchant profile;
   obtaining, by the server computer, an exchange rate between the first currency and the second currency;
   automatically determining, by the server computer, a converted transaction total in the first currency using the exchange rate;
   evaluating, by the server computer, the converted transaction total in the first currency using the first value from the fraud detection rule; and
   providing, by the server computer, a message based on the evaluation of the converted transaction total in the first currency using the first value from the fraud detection rule.

2. The method of claim 1, wherein automatically determining the converted transaction total in the first currency further comprises:
   receiving a currency conversion table;
   analyzing the currency indicator to determine the second currency; and
   calculating the converted transaction total in the first currency from the received transaction total in the second currency using the currency conversion table.

3. The method of claim 2, wherein the currency conversion table is received from an external data source at predetermined intervals.

4. The method of claim 1, wherein evaluating the converted transaction total in the first currency using the first value from the fraud detection rule further comprises:
   incrementing a counter associated with the fraud detection rule upon the fraud detection rule being triggered;
   evaluating the counter with a set of fraud detection rules in the merchant profile; and
   determining if the counter is greater than a maximum value in one or more of the set of fraud detection rules.

5. The method of claim 4, wherein the fraud detection rule is triggered if the converted transaction total exceeds the first value.

6. The method of claim 1, wherein evaluating the converted transaction total in the first currency using the first value from the fraud detection rule further comprises:
   determining if the converted transaction total exceeds the first value.

7. The method of claim 1, wherein providing the message based on the evaluation of the converted transaction total in the first currency using the first value from the fraud detection rule further comprises:
   generating a data message based on the evaluation; and
   transmitting the data message to a merchant computer.

8. The method of claim 1, wherein the transaction data is received in an authorization response message.

9. The method of claim 1, wherein the fraud detection rule is a rule for a maximum transaction total.

10. The method of claim 1, wherein the fraud detection rule is a rule for a maximum number of transactions over a predetermined amount for a predetermined time period.

11. A server computer comprising:
    a processor; and
    a non-transitory computer-readable storage medium, comprising code executable by the processor for implementing a method comprising:
       providing a user interface on a client computer for viewing and modifying a plurality of fraud detection rules for detecting fraudulent transactions;
       receiving a first value in a first currency via the user interface on the client computer operated by a user;
       generating a fraud detection rule using the received first value in the first currency;
       storing the fraud detection rule and the first currency in a merchant profile;
       subsequent to storing the fraud detection rule, receiving transaction data including a transaction total and a currency indicator;
       determining that the currency indicator corresponds to a second currency that is different from the first currency stored in the merchant profile;
       obtaining an exchange rate between the first currency and the second currency;
       automatically determining a converted transaction total in the first currency using the exchange rate;
       evaluating the converted transaction total in the first currency using the first value from the fraud detection rule; and
       providing a message based on the evaluation of the converted transaction total in the first currency using the first value from the fraud detection rule.

12. The server computer of claim 11, wherein automatically determining the converted transaction total in the first currency further comprises:
    receiving a currency conversion table;
    analyzing the currency indicator to determine the second currency; and
    calculating the converted transaction total in the first currency from the received transaction total in the second currency using the currency conversion table.

13. The server computer of claim 12, wherein the currency conversion table is received from an external data source at predetermined intervals.

14. The server computer of claim 11, wherein evaluating the converted transaction total in the first currency using the first value from the fraud detection rule further comprises:

incrementing a counter associated with the fraud detection rule upon the fraud detection rule being triggered;

evaluating the counter with a set of fraud detection rules in the merchant profile; and determining if the counter is greater than a maximum value in one or more of the set of fraud detection rules.

15. The server computer of claim 14, wherein the fraud detection rule is triggered if the converted transaction total exceeds the first value.

16. The server computer of claim 11, wherein evaluating the converted transaction total in the first currency using the first value from the fraud detection rule further comprises:

determining if the converted transaction total exceeds the first value.

17. The server computer of claim 11, wherein providing the message based on the evaluation of the converted transaction total in the first currency using the first value from the fraud detection rule further comprises:

generating a data message based on the evaluation; and transmitting the data message to a merchant computer.

18. The server computer of claim 11, wherein the transaction data is received in an authorization response message.

19. The server computer of claim 11, wherein the fraud detection rule is a rule for a maximum transaction total.

20. The server computer of claim 11, wherein the fraud detection rule is a rule for a maximum number of transactions over a predetermined amount for a predetermined time period.

* * * * *